(12) United States Patent
Nakanishi et al.

(10) Patent No.: US 8,681,163 B2
(45) Date of Patent: Mar. 25, 2014

(54) DISPLAY DEVICE, CONTROL METHOD OF DISPLAY DEVICE AND ELECTRONIC APPARATUS

(75) Inventors: Takayuki Nakanishi, Kanagawa (JP);
Fumitaka Gotoh, Kanagawa (JP);
Naoyuki Takasaki, Kanagawa (JP);
Ryoichi Tsuzaki, Kanagawa (JP);
Tsutomu Harada, Kanagawa (JP);
Toshihiko Tanaka, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 176 days.

(21) Appl. No.: 13/317,371

(22) Filed: Oct. 17, 2011

(65) Prior Publication Data
US 2012/0154416 A1   Jun. 21, 2012

(30) Foreign Application Priority Data
Dec. 20, 2010   (JP) .................... 2010-283486

(51) Int. Cl.
*G06T 1/60*   (2006.01)
(52) U.S. Cl.
USPC ........................................ 345/530
(58) Field of Classification Search
None
See application file for complete search history.

(56) References Cited

U.S. PATENT DOCUMENTS

| 2002/0093472 | A1* | 7/2002 | Numao ............................ 345/87 |
| 2003/0006977 | A1* | 1/2003 | Hanari et al. ................. 345/204 |
| 2005/0231456 | A1* | 10/2005 | Nakamura et al. .............. 345/98 |
| 2007/0176875 | A1* | 8/2007 | Kageyama et al. ............. 345/92 |
| 2009/0096947 | A1 | 4/2009 | Teranishi et al. |

FOREIGN PATENT DOCUMENTS

JP   2009-098234   5/2009

OTHER PUBLICATIONS

Extended European Search Report issued May 12, 2012 for corresponding European Application No. 11 18 6195.

* cited by examiner

*Primary Examiner* — David Zarka
*Assistant Examiner* — Khoa Vu
(74) *Attorney, Agent, or Firm* — Rader, Fishman & Grauer PLLC

(57) ABSTRACT

A display device includes: a display unit in which pixels including memories are arranged; a memory unit holding data; and a control unit rewriting the contents held by memories concerning pixels belonging to a partial area of the display unit based on data held by the memory unit in accordance with instructions given from the outside.

20 Claims, 22 Drawing Sheets

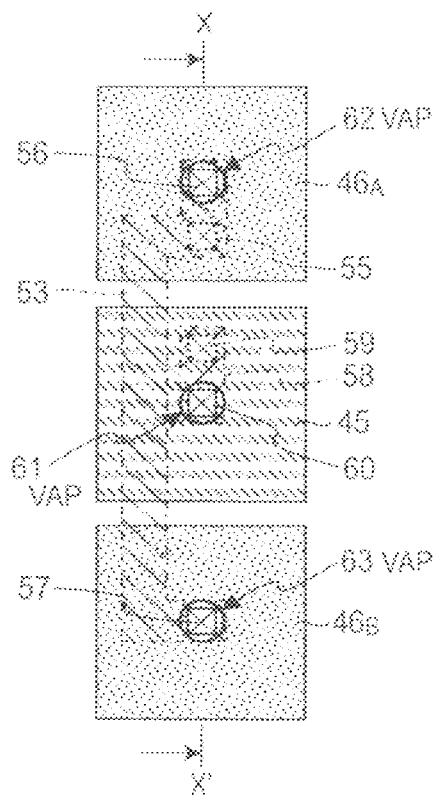
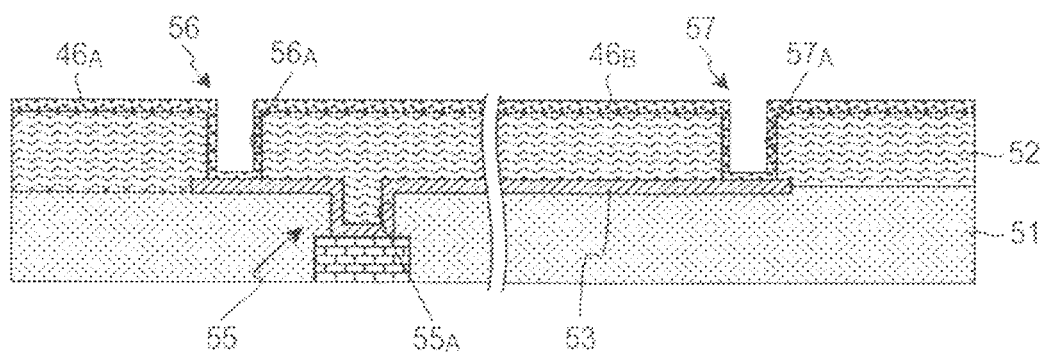

SPECULAR SURFACE TO THE EYES

Ra 11nm
Rpv 72nm

WITH ROUGHNESS

Ra 85nm
Rpv 469nm

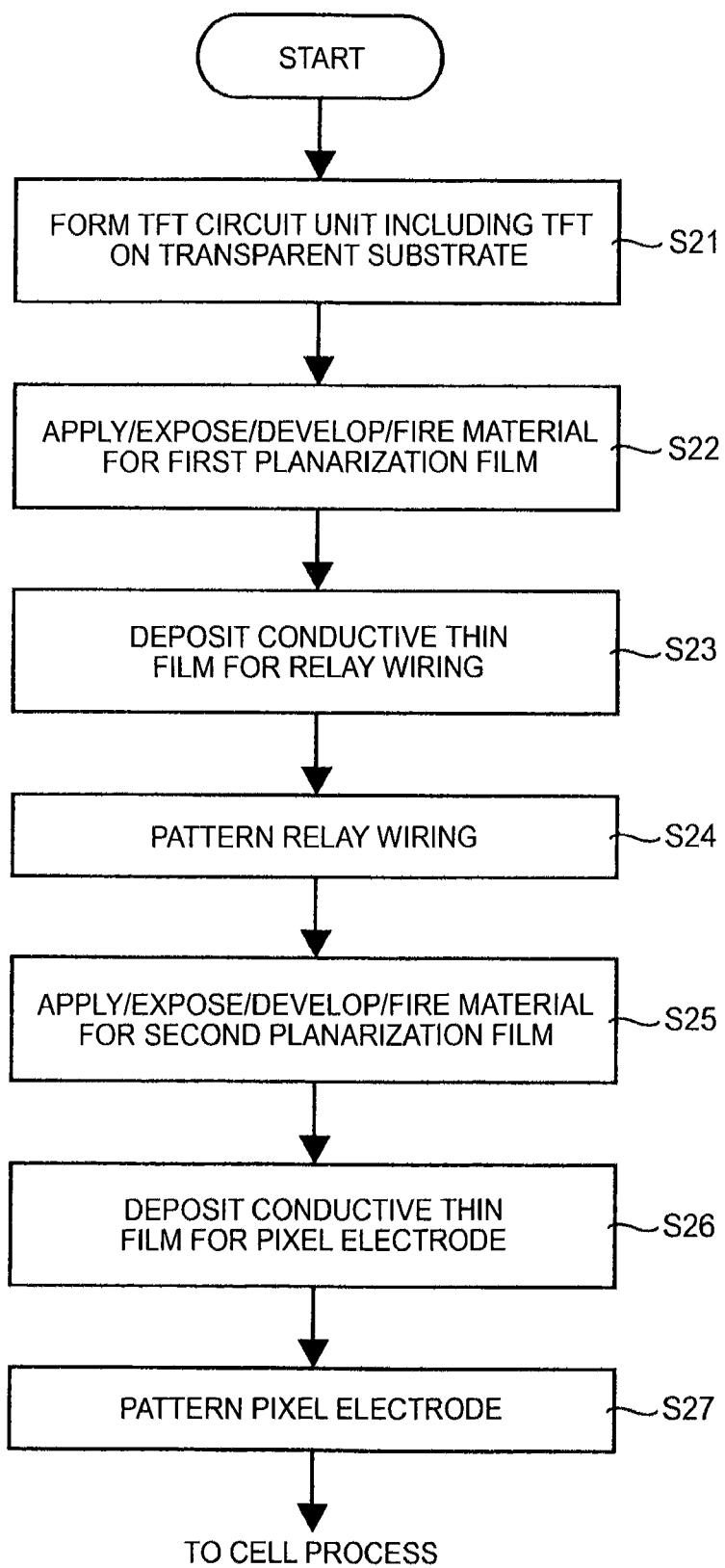

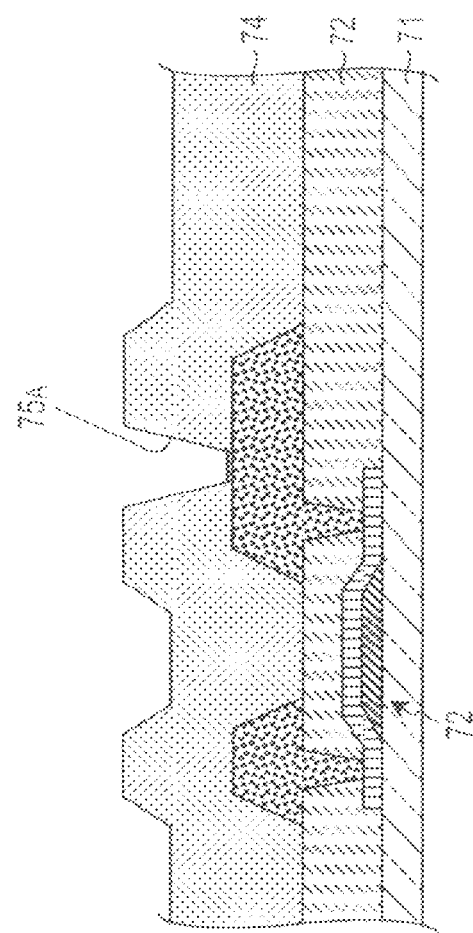
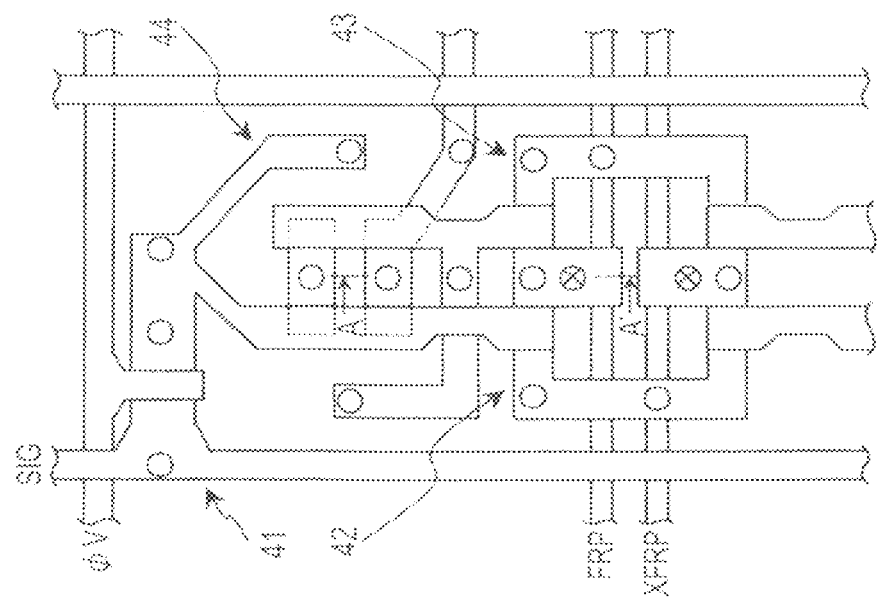

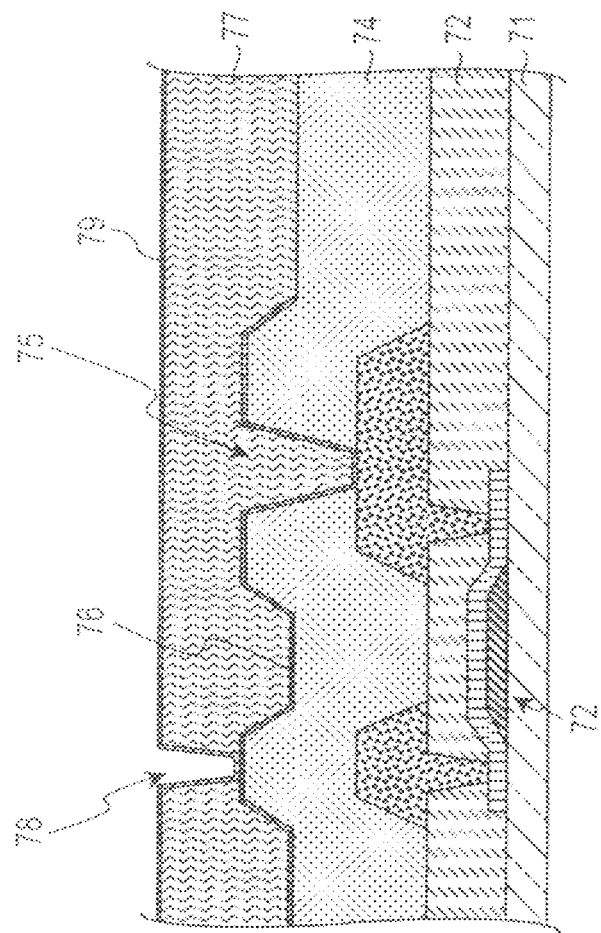
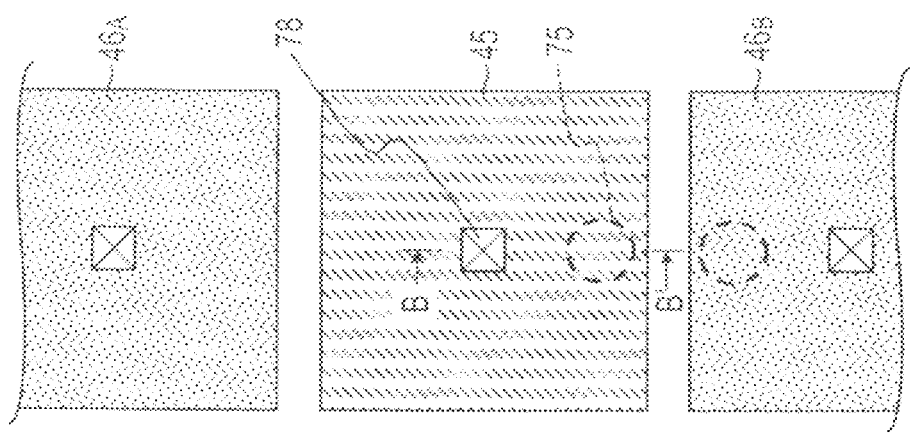
FIG.16A
FIG.16B

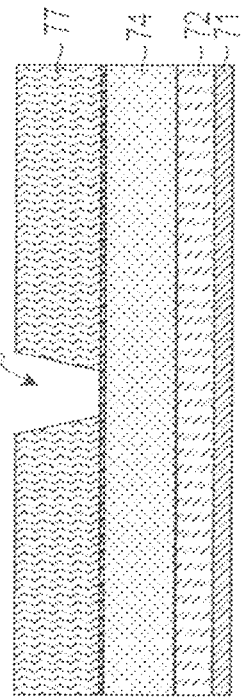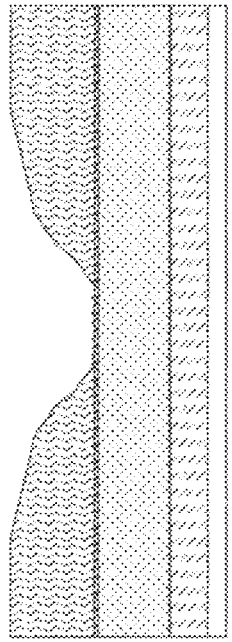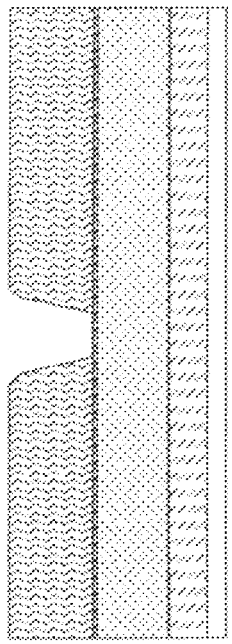
FIG. 17A GLASS TRANSITION TEMPERATURE OF SECOND-LAYER PLANARIZATION FILM
FIG. 17B LOW MELT FLOW Tg>T
FIG. 17C HIGH MELT FLOW Tg≤T
SECOND-LAYER PLANARIZATION FILM FIRING TEMPERATURE=T

CROSS SECTION
OPTICALLY INACTIVE AREA: SMALL

SURFACE MICROSCOPE IMAGE (INCIDENT LIGHT)

CROSS SECTION

SURFACE MICROSCOPE IMAGE
(INCIDENT LIGHT)

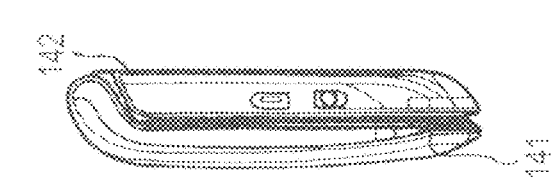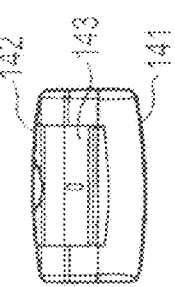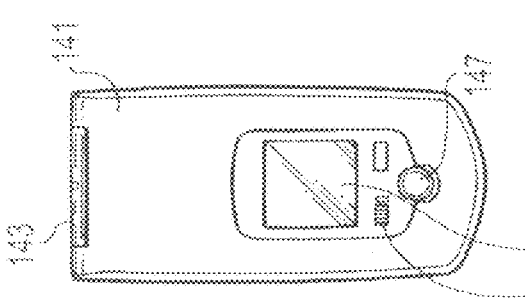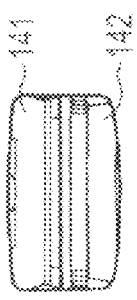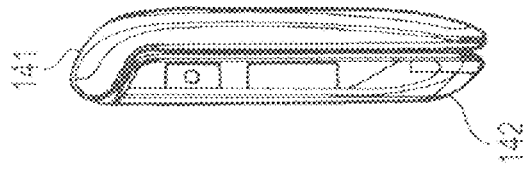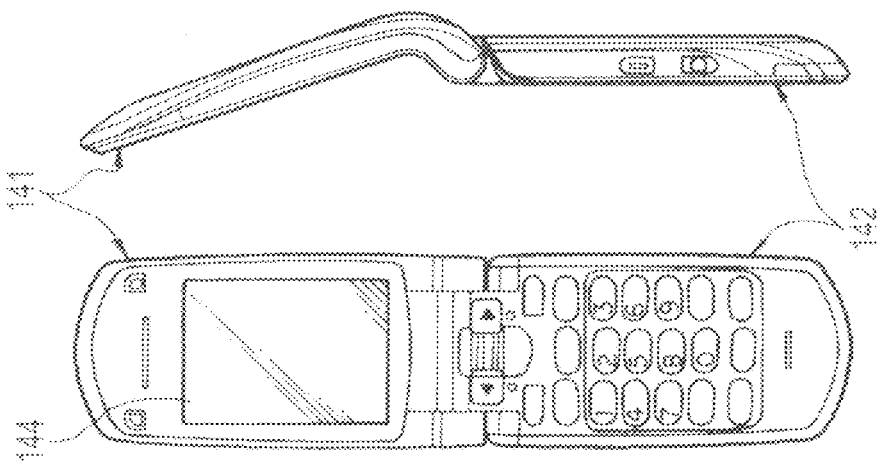

DISPLAY DEVICE, CONTROL METHOD OF DISPLAY DEVICE AND ELECTRONIC APPARATUS

FIELD

The present disclosure relates to a display device, a control method of the display device and an electronic apparatus.

BACKGROUND

There is a display device having memories for storing data in pixels (for example, refer to JP-A-2009-98234 (Patent Document 1). The display device having memories in pixels can hold display data which has been written once in pixels. Accordingly, when data is partially rewritten in respective pixels in a pixel array unit, the amount of data to be transferred can be reduced, therefore, low-power consumption of the display device can be realized.

In a related-art system including the display device having memories in pixels, display data is regularly rewritten from a driver IC driving the display device in synchronization with a synchronization signal such as a vertical synchronization signal. That is, display data is rewritten in synchronization with the vertical synchronization signal in the related-art system.

SUMMARY

In the above related-art technique, display data inputted from the outside has to be synchronized with the vertical synchronization signal, therefore, display data for one screen to be newly displayed has to be created in the outside in advance and the created display data has to be transferred. However, it is ineffective to transfer display data for one screen in synchronization with the vertical synchronization signal, for example, when there is the need for rewriting part of a display screen frequently, therefore, there is a demand for rewriting display data at an arbitrary timing.

In view of the above, it is desirable to provide a display device capable of performing rewrite processing of pixel data at an arbitrary timing without synchronizing data inputted from the outside with the vertical synchronization signal, a drive method of the display device and an electronic apparatus including the display device.

An embodiment of the present disclosure is directed to a display device including a display unit in which pixels including memories are arranged, and a memory unit holding data, wherein the contents held by memories concerning pixels belonging to a partial area of the display unit are rewritten based on data held by the memory unit in accordance with instructions given from the outside.

In the display device having the above configuration, the contents held by memories concerning pixels belonging to a partial area of the display unit is rewritten in accordance with instructions given from the outside, thereby performing rewrite processing at the timing of a writing request given from the customer's side, not rewriting of data in synchronized with a vertical synchronization signal.

According to the embodiment of the present disclosure, rewrite processing of pixel data can be performed at an arbitrary timing without synchronizing data inputted from the outside with the vertical synchronization signal.

BRIEF DESCRIPTION OF THE DRAWINGS

FIGS. 9A and 9B are explanatory view concerning a pixel structure according to Example 1 of three-divided pixels applying the area gradation method, in which FIG. 9A is a plan view showing three sub-pixel electrodes and FIG. 9B is an arrow cross-sectional view taken along line X-X' of FIG. 9A;

FIGS. 10A and 10B are explanatory view concerning a pixel structure according to Example 2 of three-divided pixels applying the area gradation method, in which FIG. 10A is a plan view showing three sub-pixel electrodes and FIG. 10B is an arrow cross-sectional view taken along line Y-Y' of FIG. 10A;

FIGS. 13A and 13B show roughness of a substrate surface obtained when a planarization film is formed and the pixel electrode is sequentially formed thereon on a TFT substrate having the pixel structure including memories, in which FIG. 13A shows the case of a planarization film having a two-layer structure and FIG. 13B shows the case a planarization film having a one-layer structure as a comparative view;

FIG. 14 is a flowchart showing the processing flow of a manufacturing method of the structure of the pixel array substrate according to the embodiment;

FIGS. 15A and 15B are explanatory views concerning a pixel circuit in the state in which a first-layer planarization film is formed, in which FIG. 15A is a plan pattern view schematically showing a plan pattern and FIG. 15B shows a cross-sectional structural view taken along line A-A' of FIG. 15A;

FIGS. 16A and 16B are explanatory views concerning a pixel circuit after forming the pixel electrode, in which FIG. 16A is a plan pattern view for schematically showing a plan pattern, and FIG. 16B shows a cross-sectional structural view taken along line B-B' in FIG. 16A;

FIGS. 17A to 17C are explanatory views concerning a melt flow rate of a second-layer planarization film;

FIGS. 20A and 20B are perspective views showing an external appearance of a digital camera to which the present disclosure is applied, in which FIG. 20A is a perspective view seen from the front and FIG. 20B is a perspective view seen from the back;

FIGS. 22A to 22G are external appearance views showing a cellular phone device to which the present disclosure is applied, in which FIG. 22A is a front view in an opened state, FIG. 22B is a side view thereof, FIG. 22C is a front view in a closed state, FIG. 22D is a left-side view, FIG. 22E is a right-side view, FIG. 22F is an upper surface view and FIG. 22G is a bottom view.

DETAILED DESCRIPTION

Hereinafter, the best mode for carrying out the present disclosure (hereinafter referred to as an "embodiment") will be explained with reference to the drawings. The explanation will be made in the following order.

1. Display device according to embodiment
1-1. System configuration
1-2. Pixel configuration of MIP
1-3. Rewriting of pixel data
1-4. Area gradation method
1-5. Pixel structure according embodiment
1-6. Specular reflection
1-7. Structure of pixel array substrate according to embodiment
2. Modification example
3. Electronic apparatus

1. Display Device According to Embodiment

Figure 1:
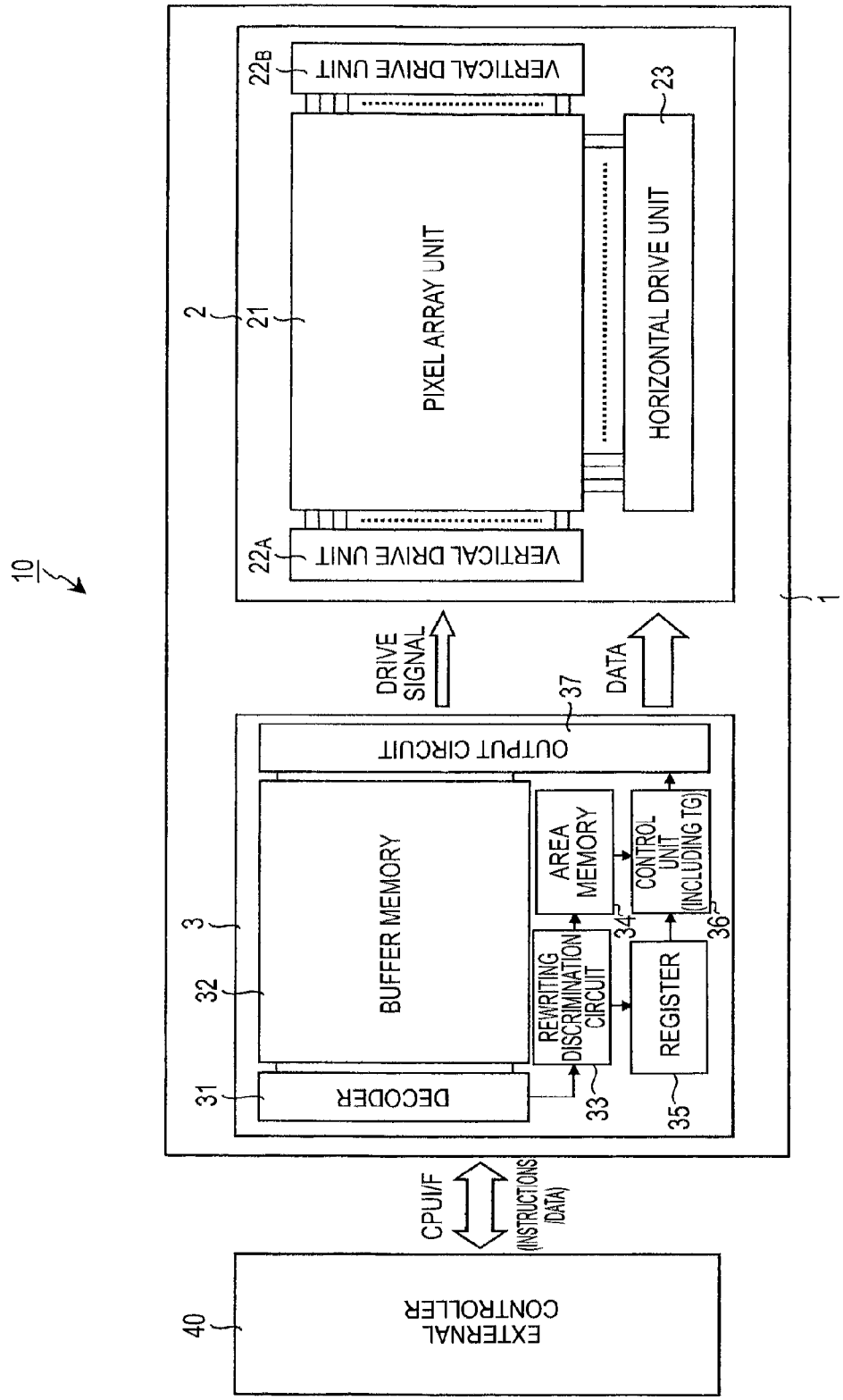
FIG. 1 is a block diagram showing an example of a system configuration of a display device according to an embodiment of the present disclosure.

FIG. 1 is a block diagram showing an example of a system configuration of a display device according to an embodiment of the present disclosure. Here, a so-called MIP (Memory In Pixel) reflective liquid crystal display device (LCD) having a memory capable of storing data in each pixel is cited as an example for explanation.

The MIP reflective liquid crystal display device can realize display in an analog display mode as well as display in a memory display mode by having memories storing data in pixels. The analog display mode is a display mode in which gradation of pixels is displayed in an analog fashion. The memory display mode is a display mode in which gradation of pixels is displayed in a digital fashion based on binary information (logic "1"/logic "0" stored in memories in pixels.

In the memory display mode, it is not necessary that writing operation of signal potentials reflecting gradation is executed in a frame period as information held in memories is used. Therefore, power consumption is lower in the memory display mode as compared with the analog display mode in which writing operation of signal potentials reflecting gradation have to be executed in the frame period. That is, power consumption of the liquid crystal display can be reduced.

In the MIP reflective liquid crystal display device, only two gradations are expressed by 1-bit in each pixel. Accordingly, the MIP reflective liquid crystal display device according to the embodiment applies an area gradation method as a gradation expression method. The area gradation method is a gradation expression method in which four gradations are expressed by 2-bit by assigning weights of 2:1 to the pixel area (area of a pixel electrode). The details of the area gradation method will be described later.

[1-1. System Configuration]

First, a system configuration of the MIP reflective liquid crystal display device according to the embodiment will be explained with reference to FIG. 1.

As shown in FIG. 1, a MIP reflective liquid crystal display device 10 according to the embodiment has a module configuration in which a TFT circuit unit 2 is formed on a transparent substrate (for example, a glass substrate) 1 and a driver IC 3 is mounted on the same substrate 1 by a COG (Chip On Glass) method. Various instructions and data are supplied to the reflective liquid crystal display device 10 (LCD module) having the module configuration from an external controller (a CPU or the like) 40 through a CPU interface (I/F).

(TFT Circuit Unit)

In the LCD module 10, the TFT circuit unit 2 includes a pixel array unit 21, vertical drive units $22_A$, $22_B$ and a horizontal drive unit 23. Concerning the TFT circuit unit 2, required minimum functions included in the TFT circuit unit 2 are shown here as a block, and the TFT circuit unit 2 is not limited to the configuration of the drawing.

Figure 2:
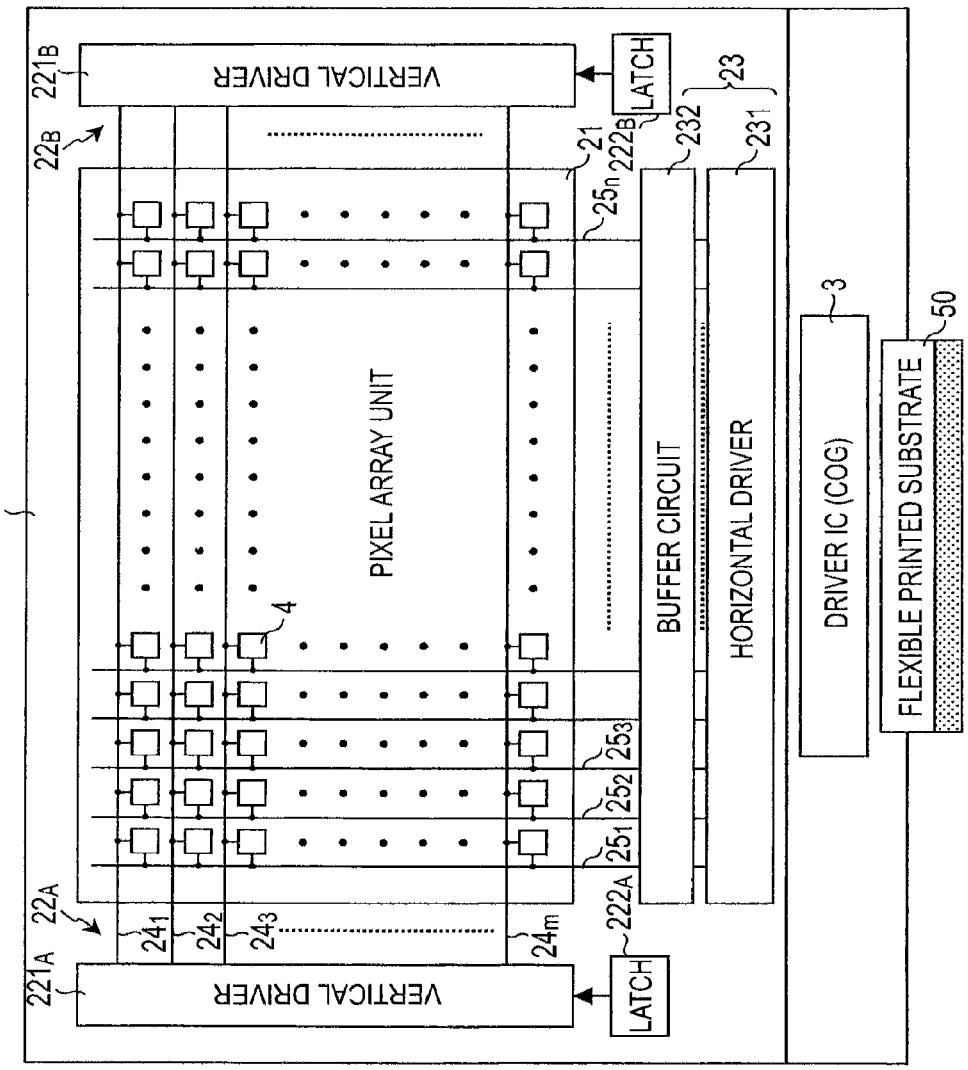
FIG. 2 is a block diagram showing an example of a specific configuration of a TFT circuit unit.

FIG. 2 shows an example of a specific configuration of the TFT circuit unit 2. As shown in the drawing, the pixel array unit 21 is configured as a display unit, in which pixels including memories capable of storing data are two-dimensionally arranged in a matrix state (array state). The details of a circuit configuration of the pixel 4 including the memory (pixel of MIP) will be described later.

In the pixel array unit 21, scanning lines $24_1$ to $24_m$ are arranged at respective pixel rows along a row direction (arrangement direction of pixels in pixel rows) with respect to pixel arrangement of m-row and n-column. Both ends of each of the scanning lines $24_1$ to $24_m$ are connected to respective output terminals of each of corresponding rows of the vertical drive unit $22_A$ and $22_B$. Also in the pixel array unit 21, signal lines $24_1$ to $24_n$ are arranged at respective pixel columns along a column direction (arrangement direction of pixels in pixel columns) with respect to pixel arrangement of m-row and n-column. One terminal of each of the signal lines $24_1$ to $24_n$ is connected to each output terminal of corresponding columns of the horizontal drive unit 23.

The vertical drive units $22_A$ and $22_B$ includes vertical drivers $221_A$, $221_B$ and V-address latches $222_A$, $222_B$. The vertical drivers $221_A$ and $221_B$ can arbitrarily select respective pixels 4 of the pixel array unit 21 on a pixel row basis. The V-address latches $222_A$ and $222_B$ stores information of row addresses given by the driver IC 3, namely, addresses in the vertical (V) direction.

The vertical drivers $221_A$ and $221_B$ are configured as, for example, decoders. The vertical drivers $221_A$ and $221_B$ configured by decoders output a scanning signal for allowing respective pixels 4 of a pixel row to be in an operational state, which are designated by address information based on the address information stored in the V-address latches $222_A$ and $222_B$.

As the vertical drivers $221_A$ and $221_B$ are configured as decoders, the pixel row can be arbitrarily selected, namely, addresses can be designated. Accordingly, when data of respective pixels 4 of the pixel array unit 21 is rewritten, not only rewriting of data in one screen but also rewriting of data of a specific area (window) by address designation on a pixel row basis can be performed.

Though the vertical drive units $22_A$ and $22_B$ are arranged at right-and-left both sides of the pixel array unit 21 in this case, the configuration is just one example. That is, the vertical drive units $22_A$ and $22_B$ can be arranged at one side (right or left) of the pixel array unit 21. However, it is preferable that the vertical drive units $22_A$ and $22_B$ are arranged at right-and-left both sides of the pixel array unit 21 as compared with the case of arranging the units only at one side from the viewpoint of suppressing propagation delay of the scanning signal outputted from the vertical drive units $22_A$ and $22_B$.

As shown in FIG. 2, the horizontal drive circuit 23 includes a horizontal driver 231 and a buffer circuit 232, which writes pixel data to respective pixels 4 of the pixel column selected by the vertical drive units $22_A$ and $22_B$. The writing method of pixel data by the horizontal drive circuit 23 can apply various methods such as a line-sequential system in which pixel data is written into respective pixels 4 of the selected row all at once or a dot-sequential system in which pixel data is sequentially written into respective pixels 4 of the selected row pixel by pixel.

(Driver IC)

In FIG. 1, the driver IC 3 includes a decoder 31, a buffer memory (memory unit) 32, a rewriting discrimination circuit 33, an area memory 34, a register 35, a control unit 36 and an output circuit 37, which are COG-mounted on the transparent substrate 1 which is the same substrate on which the TFT circuit unit 2 is formed. Concerning the driver IC 3, required minimum functions included in the driver circuit 3 are shown here as a block, and the driver IC 3 is not limited to the configuration of the drawing.

In the driver IC 3, data and instructions are supplied to the decoder 31 from the external controller 40 through, for example, a flexible printed substrate 50 (refer to FIG. 2). The data supplied to the decoder 31 is data for rewriting data (image data/pixel data) stored in memories of respective pixels 4 of the pixel array unit 21.

Instructions supplied to the decoder 31 are instructions for indicating rewriting of data of respective pixels 4 of the pixel array unit 21. The instructions include information concerning the timing at which rewriting of data is started or concerning an area. Specifically, for example, area information concerning the area where data is rewritten, namely, information of an XY start address and an XY end address, information such as a rewrite instruction indicating rewriting of data are included in instructions.

Here, data for rewriting and instructions for indicating rewriting (for example, a screen refresh command) are transmitted from the external controller 40 to the decoder 31 in time series in the order of data and instructions.

The decoder 31 separates data and instructions supplied from the external controller 40, supplying data to the buffer memory 32 and supplying instructions to the rewriting discrimination circuit 33. The buffer memory 32 temporarily stores and holds data supplied from the external controller 40 for rewriting data of respective pixels 4 of the pixel array unit 21 through the flexible printed substrate 50 and the decoder 31.

As the buffer memory 32, for example, a frame memory capable of storing data for one screen displayed by respective pixels 4 of the pixel array unit 21 can be used. However, the buffer memory 32 is not limited to the frame memory. When frame memory is used as the buffer memory 32, the buffer memory 32 can store (record) respective pixel data of the area in which data is rewritten with 1 to 1 correspondence with respect to XY addresses of respective pixels 4 of the pixel array unit 21.

When the rewriting discrimination circuit 33 discriminates (interprets) instructions supplied from the decoder 31, the circuit gives information of the XY start address and the XY end address of the rewriting area included in the instructions to the area memory 34 and gives the screen refresh command indicating the start timing of rewriting data to the register 35. The area memory 34 stores respective information of the XY start address and the XY end address of the area where data rewriting performed, which has been given by the rewriting discrimination circuit 33. The resister 35 stores the screen refresh command given by the rewriting discrimination circuit 33.

The control unit 36 includes a timing generator (TG). The timing generator generates various timing signals for setting the timing of writing or the timing of reading data with respect to the buffer memory 32 as well as the timing of driving the vertical drive units $22_A$ and $22_B$ and the horizontal drive unit 23 under control by the control unit 36.

The control unit 36 starts the operation for rewriting data based on the screen refresh command stored in the register 35, for example, when rewriting data of respective pixels 4 of the pixel array unit 21. Then, the control unit 36 performs timing control of various timing signals generated by the timing generator based on respective information of the XY start address and the XY end address of the area where data rewriting is performed stored in the area memory 34.

The output circuit 37 reads out data stored in the buffer memory 32 based on the various timing signals given from the control unit 36 and outputs the data to the TFT circuit unit 2, specifically, to the horizontal drive unit 23 in the TFT circuit unit 2. The output circuit 37 outputs the drive signal for driving the vertical drive units $22_A$, $22_B$ and the horizontal drive unit 23 to the TFT circuit unit 2 based on various timing signals given from the control unit 36.

[1-2. Pixel Configuration of MIP]

Figure 3:
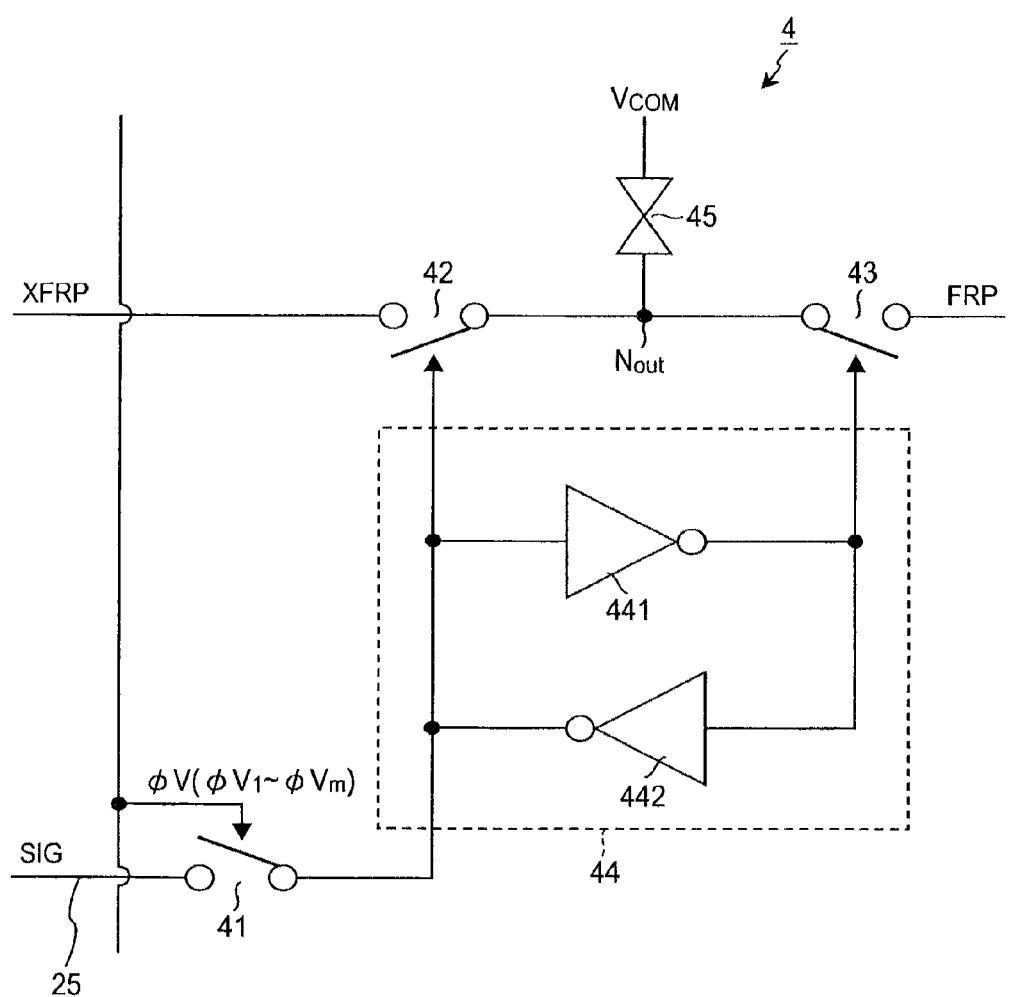
FIG. 3 is a block diagram showing an example of the circuit configuration of a pixel of MIP.

Subsequently, the details of a circuit configuration of the pixel 4 including the memory (pixel of MIP) will be explained. FIG. 3 is a block diagram showing an example of the circuit configuration of the pixel 4 of MIP.

Figure 4:
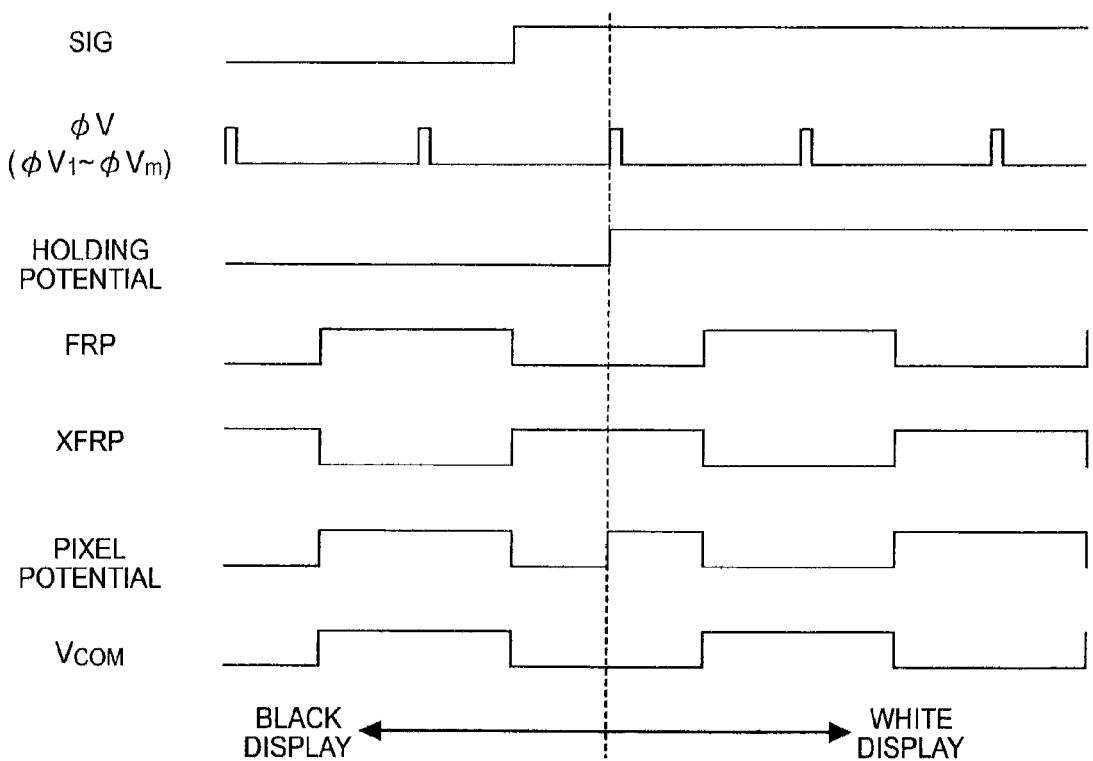
FIG. 4 is a timing chart for explaining operation of the pixel of MIP.

As shown in FIG. 3, the pixel 4 has a pixel configuration with a SRAM function including three switching devices 41 to 43, a latch unit 44 and a liquid crystal cell 45. The liquid crystal cell 45 indicates a liquid crystal capacitor generating between a pixel electrode and a counter electrode arranged opposite to the pixel electrode. FIG. 4 shows a timing chart for explaining operation of the pixel 4 of MIP.

The switching device 41 is connected to a signal line 25 ($25_1$ to $25_n$) at one end thereof, which is turned on (closed) when a scanning signal ϕV (ϕ$V_1$ to ϕ$V_m$) is given from the vertical drive units $22_A$ and $22_B$, and takes data SIG through the signal line 25 ($25_1$ to $25_n$). The latch unit 44 includes inverters 441 and 442 which are connected in parallel and face opposite directions, holding (latching) a potential corresponding to the data SIG taken by the switching device 41.

One of the switching devices 42 and 43 is turned on in accordance with the polarity of the holding potential of the latch unit 44, giving a control pulse FRP which is the same phase as a common potential $V_{COM}$ or a control pulse XFRP which is a reverse phase as the common potential $V_{COM}$ to the liquid crystal cell 45 to which the common potential $V_{COM}$ is applied at the counter electrode. A node to which respective one terminals of the switching devices 42 and 43 are connected will be an output node $N_{out}$ of the pixel circuit.

As apparent from FIG. 4, when the holding potential of the latch unit 44 is negative polarity, the pixel potential of the liquid crystal 45 is in the same phase as the common potential $V_{COM}$, therefore, black display is performed. When the holding potential of the latch unit 44 is positive polarity, the pixel potential of the liquid crystal cell 45 is in the reverse phase as the common potential $V_{COM}$, therefore, white display is performed.

Figure 5:
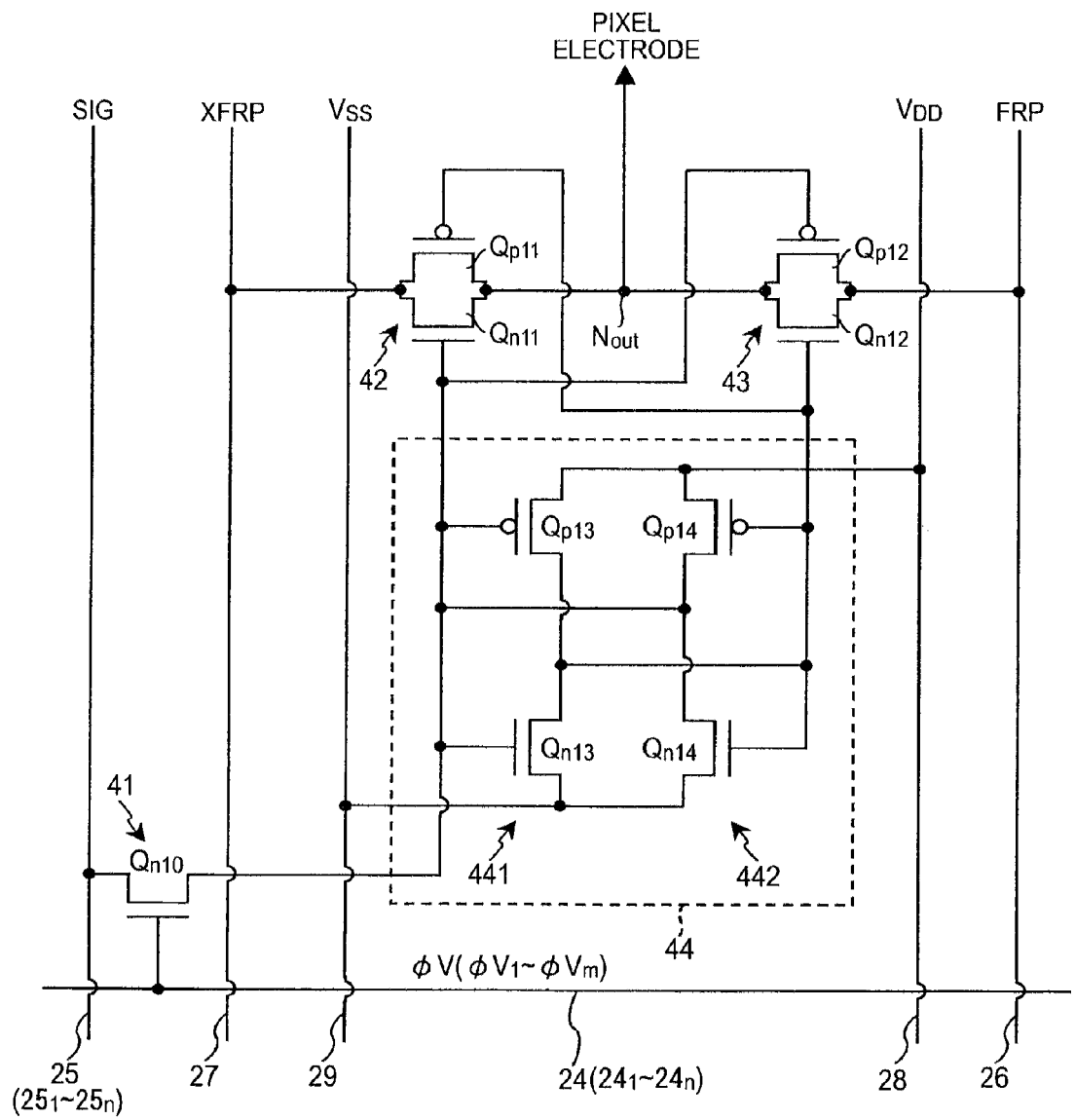
FIG. 5 is a circuit diagram showing an example of a specific circuit configuration of the pixel of MIP.

FIG. 5 is a circuit diagram showing an example of a specific circuit configuration of the pixel 4, in which the same signs are given to components corresponding to FIG. 3.

In FIG. 5, for example, an NchMOS transistor $Q_{n10}$ is used as the switching device 41. The NchMOS transistor $Q_{n10}$ is connected to the signal line 25 ($25_1$ to $25_n$) at source/drain thereof and connected to the scanning line 24 ($24_1$ to $24_m$) at a gate thereof.

Both of the switching devices 42 and 43 apply, for example, transfer switches in which an NchMOS transistor and a PchMOS transistor are connected in parallel. Specifically, the switching device 42 has a configuration in which an NchMOS transistor $Q_{n11}$ and a PchMOS transistor $Q_{P11}$ are connected in parallel to each other. The switching device 43 has a configuration in which an NchMOS transistor $Q_{n12}$ and a PchMOS transistor $Q_{P12}$ are connected in parallel to each other.

It is not always necessary that the switching devices 42 and 43 are the transfer switches in which the NchMOS transistor and the PchMOS transistor are connected in parallel. The switching devices 42 and 43 can be configured by using MOS transistors of the same conductive type, namely, by using NchMOS transistors or PchMOS transistors. A common connection node of the switching devices 42 and 43 will be the output node $N_{out}$ of the present pixel circuit.

Both of the inverters 441 and 442 apply, for example, CMOS inverters. Specifically, the inverter 441 has a configuration in which an NchMOS transistor $Q_{n13}$ and a PchMOS transistor $Q_{p13}$ are connected in common at respective gates or respective drains thereof. The inverter 442 has a configuration in which an NchMOS transistor $Q_{n14}$ and a PchMOS transistor $Q_{p14}$ are connected in common at gates or drains thereof.

The pixels 4 basically having the above circuit configuration are laid out in the horizontal direction and the vertical direction and arranged in the matrix state. In addition to the scanning lines 24 ($24_1$ to $24_m$) for respective rows and the signal lines 25 ($25_1$ to $25_n$) for respective columns, control lines 26 and 27 transmitting the control pulses FRP and XFRP as well as power supply lines 28 and 29 supplying a positive power supply voltage $V_{DD}$ and a negative power supply voltage $V_{SS}$ are arranged for respective columns in the matrix-state arrangement of the pixels 4.

As described above, the active-matrix type liquid crystal display device 10 according to the embodiment has a configuration in which pixels (MIP) 4 with the SRAM function each including the latch unit 44 storing the potential corresponding to display data are arranged in the matrix state. Though the case of using the SRAM as a memory included in the pixel is cited as an example in the embodiment, the SRAM is just an example and memories having other configurations, for example, a DRAM can be used.

The MIP active matrix-type liquid crystal display device 10 can realize display in the analog display mode as well as display in the memory display mode by including the memory in each pixel 4 as described above. The display is performed by using pixel data held in the memory in the memory display mode, therefore, it is not necessary to execute writing operation of signal potentials reflecting gradation in the frame period, which reduces power consumption of the liquid crystal display device.

There is the need for rewriting the display screen partially, namely, rewriting part of the display screen. In this case, pixel data is partially rewritten. When the display screen is partially rewritten, namely, when pixel data is partially rewritten, it is not necessary to transfer data to pixels where rewriting is not performed. Therefore, there are advantages that the data transfer amount can be reduced and power consumption of the liquid crystal display device can be reduced accordingly.

[1-3. Rewriting of Pixel Data]

There is the need for rewriting the display screen partially, namely, for rewriting part of the display screen in an electronic apparatus on which the MIP active matrix-type liquid crystal display device 10 is mounted. In response to this, data of pixels 4 is rewritten by the driver IC 3 regularly (for example, per cycle of 60 Hz) in synchronization with a synchronization signal such as a vertical synchronization signal $V_{sync}$ (hereinafter referred to merely as "vertical synchronization signal $V_{sync}$") in the related art system.

That is, rewriting of pixel data is performed in synchronization with the vertical synchronization signal $V_{sync}$ in the related art system. Accordingly, when display data to be rewritten is inputted from the external controller 40 to the driver IC 3, display data for one screen will be inputted in synchronization with the vertical synchronization signal $V_{sync}$ created on the external controller 40 side. Or, the vertical synchronization signal $V_{sync}$ is created on the driver IC 3 side and transmitted to the external controller 40, and display data for one screen is inputted on the external controller 40 side during a period until the next vertical synchronization signal $V_{sync}$ comes.

The reason for the above is the relation between the timing of rewriting pixel data and the timing of writing display data from the external controller 40 into the buffer memory 32. That is, when display data is written into the pixels 4 just at the timing of the drive IC 3 side, there is a worry that the former timing overlaps with the latter timing or that the latter timing is faster than the former timing.

The state in which the latter timing is faster than the former timing is generated by the following reason. That is because communication speed between the external controller 40 and the driver IC 3 is faster than communication speed between the TFT circuit unit 2 and the driver IC 3 as can be seen from the fact that data transfer between the external controller 40 and the driver IC 3 is performed in synchronized with the vertical synchronization signal $V_{sync}$. When the latter timing is faster than the former timing, switching of display will be shifted by one frame, which may cause display failures such as streaks.

As described above, as display data inputted from the outside have to be synchronized with the vertical synchronization signal $V_{sync}$ in the related art system, it is necessary that display data for one screen to be newly displayed is created in the outside in advance and that the display data is transferred to the driver IC 3. However, it is actually inefficient that display data for one screen is transferred in synchronization with the vertical synchronization signal $V_{sync}$ in the case that there are many occasions that part of display screen is desired to be rewritten.

Accordingly, the MIP liquid crystal display device 10 according to the present embodiment applies a configuration of performing rewrite processing at an arbitrary timing by receiving a request of rewriting pixel data from the customer's side, namely, the external controller 40 side, not performing rewrite processing of pixel data in synchronization with the vertical synchronization signal $V_{sync}$. That is, pixel data (display data) is inputted to the liquid crystal display device 10 in an asynchronous state with respect to the vertical synchronization signal $V_{sync}$ from the outside.

Specifically, first, display data to be received from the customer's (external controller 40) side is not data for one screen but data concerning pixels 4 belonging to an area where rewriting is performed, and the partial display data is stored in the buffer memory 32 for the moment. The buffer memory 32 does not have to be the frame memory, namely, the memory capable of storing display data for one screen as display data to be held in the buffer memory 32 is not data for one screen.

The partial display data of the area to be rewritten is transmitted from the external controller 40 to the driver IC 3 with instructions for indicating rewriting in time series. For example, display data is first transmitted from the external controller 40 to the driver IC 3, then, the instructions for indicating rewriting (screen refresh command) are transmitted after a certain period of time passes. When receiving the screen refresh command from the external controller 40, the driver IC 3 can perform rewrite processing of pixel data based on display data stored in the buffer memory 32 even when the vertical synchronization signal $V_{sync}$ is not interposed in data transmission with respect to the external controller 40.

Figure 6:
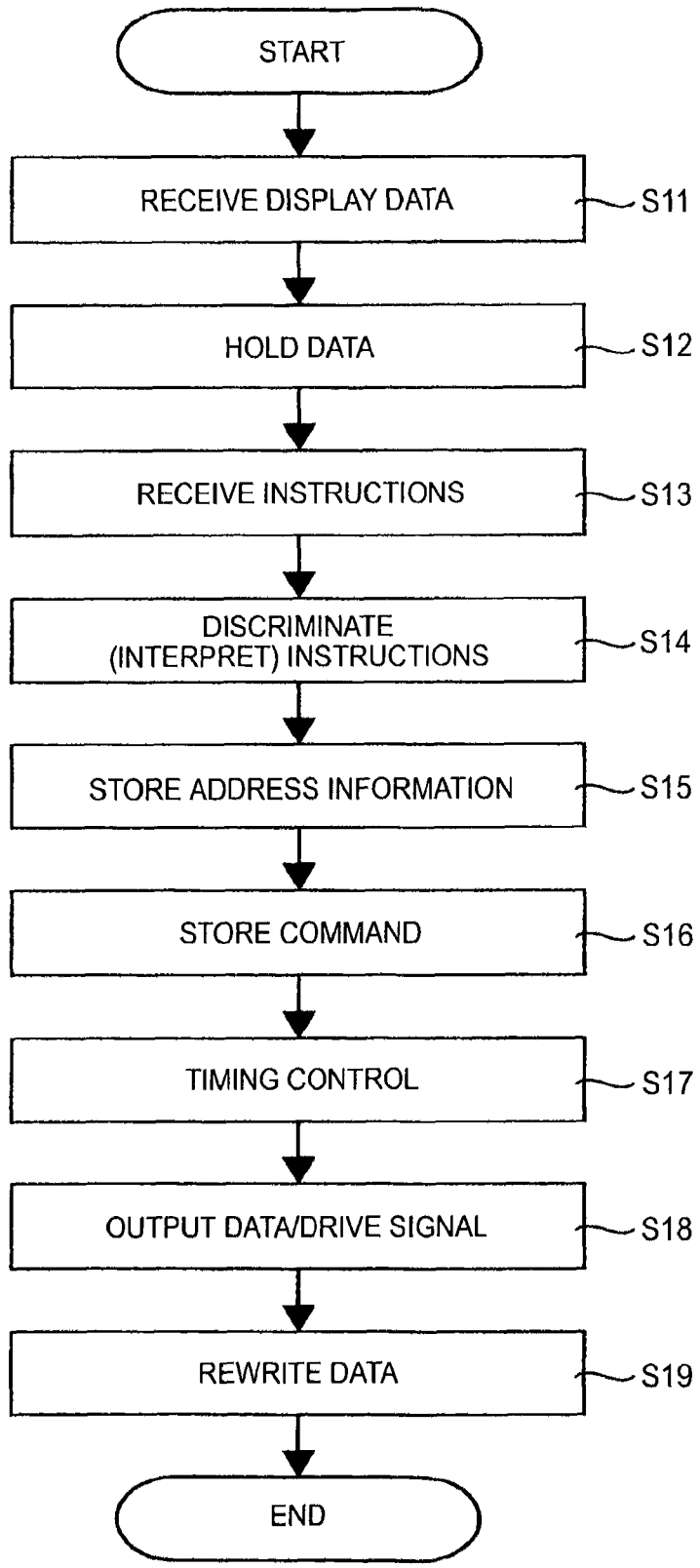
FIG. 6 is a flowchart showing specific processing procedures of partial rewrite processing of pixel data in a driver IC.

Specific processing procedures of partial rewrite processing of pixel data in the driver IC 3 will be explained as follows with reference to a flowchart of FIG. 6. The rewrite processing is basically the processing of the driver IC 3. Data and instructions are inputted from the external controller 40 to the driver IC 3 in time series.

First, when the driver IC 3 receives display data to be rewritten (Step S11), the driver IC 3 writes the display data into the buffer memory 32 so as to be temporarily held in the buffer memory 32 (Step S12). Next, when receiving the instructions indicating rewriting (Step S13), the driver IC 3 supplies the instructions to the rewriting discrimination circuit 33 to be discriminated (interpreted) in the rewriting discrimination circuit 33 (Step S14).

Then, the rewriting discrimination circuit 33 stores information of the XY start address and the XY end address of the rewriting area included in the instructions in the area memory 34 (Step S15). The screen refresh command instructing data rewriting is stored in the register 35 (Step S16).

Next, when the screen refresh command is stored in the register 35, the control unit 36 receives the command and starts timing control for rewriting data (Step S17). Specifically, the control unit 36 performs timing control of the timing generator (TG) based on respective information of the XY start address and the XY end address stored in the area memory 34.

In the case where the buffer memory 32 is the frame memory, the area of storing data can be controlled under control of the control unit 36 based on respective information of the XY start address and the XY end address at the time of temporarily storing data in the buffer memory 32.

Next, data stored in the buffer memory 32 is read out and outputted to the TFT circuit unit 2 under control of the control unit 36 as well as the drive signal is outputted to the vertical drive units 22$_A$ and 22$_B$ and the horizontal drive unit 23 (Step S18). Then, pixel data is rewritten on a pixel row basis under the driving by the vertical drive units 22$_A$ and 22$_B$ and the horizontal drive unit 23 (Step S19).

Specifically, the vertical drive units 22$_A$ and 22$_B$ select pixel rows (lines), for example, in order, which belong to an area (window) designated by respective information of the XY start address and the XY end address. On the other hand, the horizontal drive unit 23 writes display data supplied from the buffer memory 32 through the output circuit 37 into respective pixels 4 of the selected row in a synchronous state with respect to selection of the pixel row by the vertical drive units 22$_A$ and 22$_B$.

According to the above series of processing, the rewrite processing can be performed at the timing of the rewriting request by receiving the rewriting request from the customer's side, not performing rewrite processing of pixel data in synchronization with the vertical synchronization signal $V_{sync}$. Accordingly, not one screen but part of display data can be inputted into the driver IC 3 at an arbitrary timing without synchronizing the display data inputted from the outside with the vertical synchronization signal $V_{sync}$ (in the asynchronous state).

When the display data can be inputted without synchronization with the vertical synchronization signal $V_{sync}$, it is not necessary to create display data to be rewritten within a period of the vertical synchronization signal $V_{sync}$ by high-speed processing at the time of creating data in the outside, or it is not necessary to perform data transfer using the frame memory for one screen as the buffer memory 32. Then, display data to be rewritten is created at an arbitrary timing and transferred to the driver IC 3, therefore, pixel data after the instruction for screen refresh can be rewritten in a moment. As a result, when areas to be rewritten overlap with each other in one screen, for example, when plural windows are rewritten, a phenomenon in which display blinks (flickers) as respective rewriting are seen for a moment can be avoided.

As apparent from the above operation explanation of rewrite processing of pixel data, rewriting of the display screen is performed not on a screen basis but on a pixel row basis concerning part of the display screen as a window (rectangular area). The reason the display screen can be partially rewritten is that the vertical drivers 221$_A$ and 221$_B$ are configured as decoders and each pixel row (line) of the pixel array unit 21 can be arbitrarily selected. It is also possible that the horizontal driver 231 is configured as a decoder and that the display screen is partially rewritten on a pixel basis.

In the above example concerning rewrite processing of pixel data, inputted instructions are discriminated and the write instruction included in instructions (for example, the screen refresh command) is stored in the resistor 35, then, the control unit 36 receives the instruction to perform rewrite processing of pixel data, however, this is just an example. As other configuration examples, for example, the control unit 36 can receive the rewrite instruction directly from the external controller 40 not through the rewriting discrimination circuit 33 and the register 35.

As the rewriting discrimination circuit 33 and the register 35 are not necessary by applying the above configuration, the circuit configuration of the driver IC 3 can be simplified. That is, the rewriting discrimination circuit 33 and the register 35 are not fundamental components of the driver IC 3.

The rewrite processing of pixel data has been explained assuming that the device is the reflective liquid crystal display device, however, the rewrite processing applied to the reflective liquid crystal display device can be also applied to a transmissive liquid crystal display device or a semi-transmissive liquid crystal display device.

[1-4. Area Gradation Method]

The liquid crystal display device 10 according to the embodiment applies the area gradation method for realizing multi-bit color of a pixel memory. Specifically, the area gradation method in which the pixel electrode to be the display area of the pixel 4 is divided into plural sub-pixel electrodes by assigning weights of 2:1 in the area is used. Then, the pixel potential selected by the holding potential of the latch unit 44 is distributed to the sub-pixel electrodes to which weights are assigned to thereby performs gradation display by combination of areas to which weights are assigned.

Here, the liquid crystal display device 10 according to the embodiment is the reflective liquid crystal display device, therefore, the sub-pixel electrodes to which weights are assigned in the area correspond to reflectors. For reference's sake, sub-pixel electrodes to which weights are assigned in the area correspond to transmissive windows in the transmissive liquid crystal display device.

The area gradation method will be specifically explained as follows. The area gradation method is a gradation expression system expressing $2^N$-gradation by N-pieces of sub-pixel electrodes to which weights are assigned in a manner of $2^0$, $2^1, 2^2, \ldots, 2^{N-1}$ in the area ratio, which is applied for the purpose of, for example, improving non-uniformity of image quality due to variations of TFT characteristics. The liquid crystal display device 10 according to the embodiment applies the area gradation method expressing four gradations by 2-bit by assigning weights of 2:1 to the area of a reflective electrode (pixel area) which is the pixel electrode.

Figure 7C:
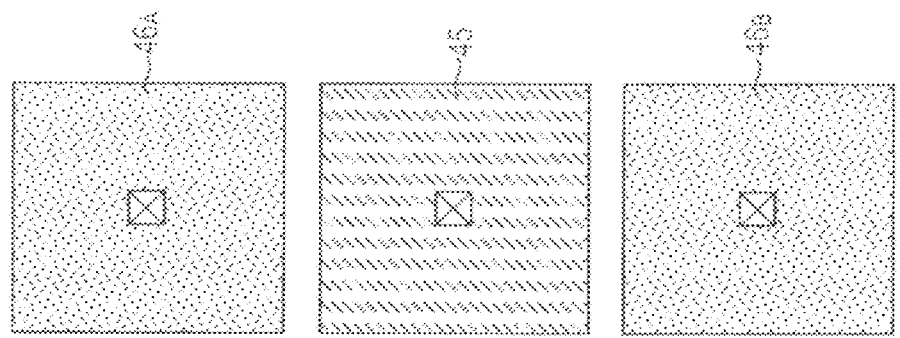
FIGS. 7A to 7C are explanatory views concerning pixel division in an area gradation method.
Figure 7B:
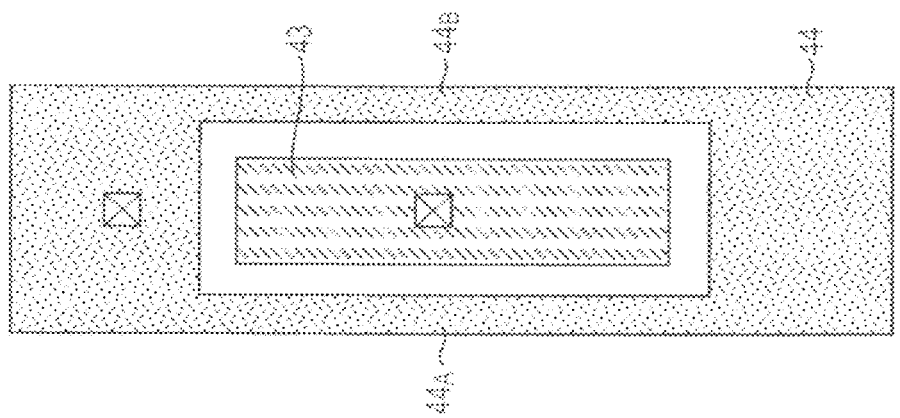
Figure 7A:
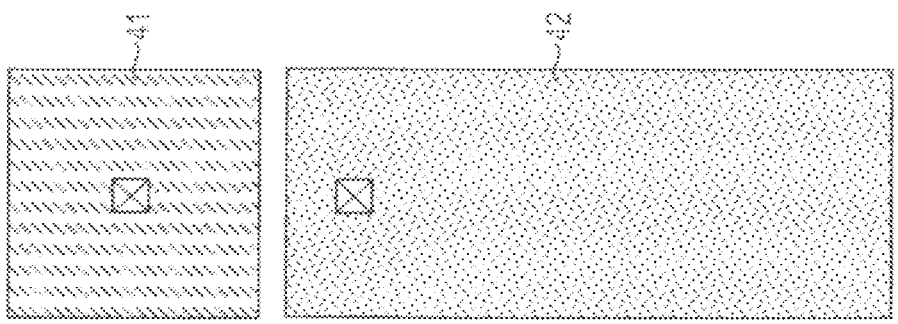

As a structure for assigning weights of 2:1 to the pixel area, a structure in which the pixel electrode of the pixel 4 is divided into a sub-pixel electrode 41 having an area "1" and a sub-pixel electrode 42 having an area (an area "2") twice as large as the area of the sub-pixel electrode 41 is common as shown in FIG. 7A. However, in the case of the structure of FIG. 7A, centroids of respective gradations do not match with (correspond to) a centroid of one pixel, which is unfavorable for gradation expression.

As a structure for matching centroids of respective gradations with the centroid of one pixel, a central part of a sub-pixel electrode 44 having the area "2" is bored in a rectangular shape and a sub-pixel electrode 43 of the area "1" is arranged on the central part of the bored rectangular area can be cited as shown in FIG. 7B. However, in the case of the structure of FIG. 7B, the width of connecting portions $44_A$ and $44_B$ of the sub-pixel electrode 44 which are positioned at both sides of the sub-pixel electrode 43 is narrow, therefore, a reflection area of the entire sub-pixel electrode 44 is small as well as liquid crystal alignment around the connecting portions $44_A$ and $44_B$ is difficult.

As described above, when a VA (Vertical Aligned) mode in which liquid crystal molecules are approximately vertical to the substrate with no application of electric field in the area gradation method, it is difficult to align liquid crystal in a good way because voltage application with respect to liquid crystal molecules differs according to the electrode shape, the electrode size and so on. It is also difficult to design gradation as the area ratio of reflective electrodes is not always the reflectance ratio. The reflectance is determined according to the area of the reflective electrode, liquid crystal display alignment and the like. In the case of the structure of FIG. 7A, the ratio of length around the electrodes is not 1:2 though the area ratio is 1:2. Therefore, the area ratio of the reflective electrodes is not always the reflectance ratio.

From this point of view and in considering gradation expression and efficient use of the reflection area in the area gradation method, it is desirable to apply three-divided pixels which are formed by dividing the pixel electrode into three sub-pixel electrodes 45, $46_A$ and $46_B$ having the same area (size). In the case of the three-divided pixels, upper and lower two sub-pixel electrodes $46_A$ and $46_B$ sandwiching the central sub-pixel electrode 45 make a pair, and the two sub-pixel electrodes $46_A$ and $46_B$ to be the pair are driven at the same time, thereby assigning weights of 2:1 with respect to the central sub-pixel electrode 45 in the pixel area. It is possible to match the centroids of respective gradations with the centroid of one pixel.

However, when respective three sub-pixel electrodes 45, $46_A$ and $46_B$ make contact with the drive circuit electrically, the number of contacts in metal wiring is increased as compared with the structures of FIGS. 7A and 7B, which increases the pixel size and will be a limiting factor for a high-definition device. In particular, in the case of the MIP pixel configuration having the memory in each pixel 4, many circuit components such as transistors and contact portions exist in one pixel 4 and there is little room in the layout area as apparent from FIG. 5, therefore, one contact portion significantly affects the pixel size.

Figure 8:
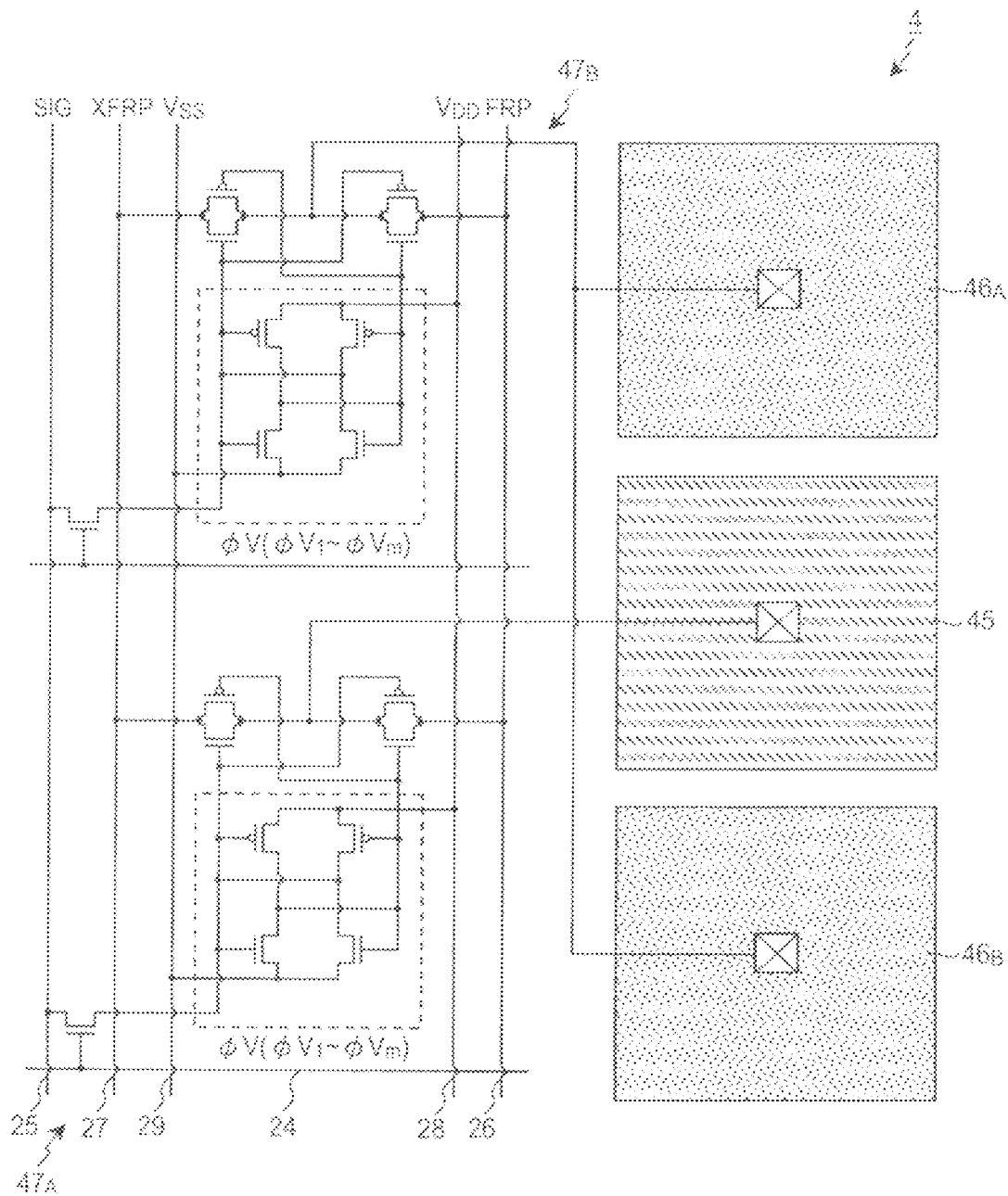
FIG. 8 is a circuit diagram showing correspondence between three sub-pixel electrodes and two-pairs of drive circuits in a three-divided pixel structure.

In order to reduce the number of contacts, it is preferable to apply a pixel structure in which two sub-pixel electrodes $46_A$ and $46_B$ which are apart from each other are electrically coupled (connected) to each other with one sub-pixel electrode 45 sandwiched therebetween. Then, as shown in FIG. 8, one sub-pixel electrode 45 is driven by one set of drive circuit $47_A$ and the remaining two sub-pixel electrodes $46_A$ and $46_B$ are simultaneously driven by the other set of drive circuit $47_B$. Here, the drive circuits $47_A$ and $48_B$ correspond to the pixel circuit shown in FIG. 5.

As described above, when applying the pixel structure in which the centroids of respective gradations match with the centroid of one pixel by using the area gradation method, it is preferable that the two sub-pixel electrodes $46_A$ and $46_B$ which are apart from each other are electrically coupled in order to reduce the number of contacts. As methods of electrically coupling the two sub-pixel electrodes $46_A$ and $46_B$, the following two methods can be considered.

One of the methods is a method of connecting the two sub-pixel electrodes $46_A$ and $46_B$ on a planarization film through contact portions formed in the planarization film by metal wiring formed under the planarization film. The other method is a method of electrically connecting the two sub-pixel electrodes $46_A$ and $46_B$ on the planarization film in the same face.

Here, it is necessary to increase the film thickness of the planarization film to some degree in order to obtain operations and effects of planarization by the planarization film, therefore, it is necessary to form a contact pedestal having a fixed size when forming contact portions including contact holes in the planarization film. Accordingly, when applying the former method, the contact pedestal having a fixed size is necessary to be formed, which increases the pixel size and will be a limiting factor for a high-definition device.

On the other hand, when applying the latter method, it is necessary to connect the two sub-pixel electrodes $46_A$ and $46_B$ by using ITO (Indium Tin Oxide) or other conductors, which reduces a display effective area (reflection area in the reflective liquid crystal display device). Moreover, in the VA mode, alignment control as well as gradation design will be difficult as the area ratio of the reflective electrodes is not always the reflectance ratio.

[1-5. Pixel Structure According Embodiment]

Accordingly, in the present embodiment, the pixel 4 applying the area gradation method is formed to have the three-divided pixel structure as follows.

Generally, a planarization film is formed on the substrate on which the circuit unit (namely, the TFT circuit unit 2 shown in FIG. 2) is formed for planarization. The planarization film is formed to have a two-layer structure in the embodiment, in which first and second planarization films are sequentially stacked. Moreover, metal wiring is formed between the planarization films having the two-layer structure, namely, between the first and second planarization films. The pixel structure in which two electrodes (sub-pixel electrodes $46_A$ and $46_B$) provided apart from each other on the second planarization film are electrically connected is formed by the metal wiring.

In the pixel structure having the above configuration, since the planarization film is made in the two-layer structure respective film thicknesses of the first and second planarization can be formed to be thinner than the film thickness of a planarization film having a one-layer structure. Then, the two electrodes (sub-pixel electrodes $46_A$ and $46_B$) provided apart from each other on the second planarization film are electrically connected through the second planarization film by the metal wiring between the first and second planarization films.

As the film thickness of the second planarization film is thinner in this case, the contact pedestal at the time of forming the contract portions for electrically connecting to the second planarization film can be reduced as compared with the case of forming the contact portions in the one-layer structure planarization film. As a result, when applying the structure in which metal wiring is formed between the planarization films having the two-layer structure and two electrodes are electrically connected through the second planarization film by the metal wiring, the pixel size can be formed to be smaller than the case of forming the contact portions on the one-layer structure planarization film.

Therefore, the pixel structure which does not hinder the realization of the high-definition display device. Furthermore, the metal wiring connecting the two electrodes (sub-pixel electrodes $46_A$ and $46_B$) is provided between the two planarization films having the two-layer structure, therefore, the display effective area (reflection area) is not reduced as in the case of providing metal wiring in the same plane as the two electrodes in the reflective liquid crystal display device.

Specific examples of the pixel structure according to the embodiment, namely, the pixel structure of, for example, the three-divided pixels applying the area gradation method which does not hinder the realization of the high-definition display device will be explained.

Example 1

FIGS. 9A and 9B are explanatory view concerning the pixel structure according to Example 1 of the three-divided pixels applying the area gradation method. FIG. 9A is a plan view showing three sub-pixel electrodes and FIG. 9B is an arrow cross-sectional view taken along line X-X' of FIG. 9A. In FIGS. 9A and 9B, the same signs are given to components equivalent to FIGS. 7A to 7C and FIG. 8. Here, the substrate of the TFT circuit unit 2 and the TFT circuit formed on the substrate are not shown.

In FIG. 9B, a first planarization film 51 and a second planarization film 52 are sequentially stacked on the substrate (not shown) on which the TFT circuit is formed to allow the planarization film to be the two-layer structure for planarizing the whole substrate. As the planarization film has the two-layer structure, respective film thicknesses of the first and second planarization films 51 and 52 can be formed to be thinner than the thickness of the planarization film having one-layer structure.

A metal wiring 53 made of ITO (Indium Tin Oxide) or other conductive materials is formed between the planarization films having the two-layer structure, namely, between the first and second planarization films 51 and 52. As other conductive materials, aluminum (Al), silver (Ag), molybdenum (Mo) and so on can be used.

In various wiring materials used for the metal wiring 53, silver (Ag) having high reflectance and ITO which can make ohmic contact are used here, however, it is also preferable to select metals other than ITO in accordance with the metal type used as the pixel electrode.

Then, the three sub-pixel electrodes 45, $46_A$, $46_B$ are formed by using an electrode material such as silver (Ag) or aluminum (Al) on the second planarization film 52 as the reflective electrodes. Here, respective sizes (reflection areas) of the three sub-pixel electrodes 45, $46_A$, $46_B$ are equal. Upper and lower two sub-pixel electrodes $46_A$ and $46_B$ sandwiching the central sub-pixel electrode 45 make a pair, and the two sub-pixel electrodes $46_A$ and $46_B$ to be the pair are driven at the same time, thereby assigning weights of 2:1 with respect to the sub-pixel electrode 45.

The first planarization film 51 includes a contact portion 55 including a contact hole $55_A$ formed in the planarization film 51. The contact portion 55 is formed at a position shifted from the central position of the sub-pixel electrodes $46_A$.

The wiring material of the metal wiring 53 forms the contact portion 55 with the contact hole $55_A$ by forming a conductive layer in the contact hole $55_A$. Then, the metal wiring 53 is electrically connected to the TFT circuit unit 2 through the contact portion 55, specifically, the drive circuits $47_B$ shown in FIG. 8.

The second planarization film 52 includes contact portions 56 and 57 respectively including contact holes $56_A$ and $57_A$ formed at portions corresponding to, for example, the central positions of the sub-pixel electrodes $46_A$ and $46_B$ in the second planarization film 52. As the contact portions 56 and 57 are arranged by being shifted with respect to the contact portion 55 in the first planarization film 51, the film thickness of the second planarization film 52 is thinner than the thickness of the planarization film of the one-layer structure, therefore, the contact holes $56_A$ and $57_A$ can be formed so that diameters thereof are smaller than diameters of the contact hole formed in the planarization film of the one-layer structure.

The electrode material for the sub-pixel electrodes $46_A$ and $46_B$ form the contact portions 56 and 57 with the contact holes $56_A$ and $57_A$ by forming the conductive layer in the contact holes $56_A$ and $57_A$. Then, the sub-pixel electrodes $46_A$ and $46_B$ are electrically connected to the metal wiring 53 through the contact portions 56 and 57.

In the first and second planarization films 51, 52 having the two-layer structure, the contact portion 56 on the sub-pixel electrode $46_A$ side is formed at a position corresponding to the central position of the sub-pixel electrode $46_A$, whereas, the contact portion 55 on the first planarization film 51 side is formed at the position shifted from the central position of the sub-pixel electrodes $46_A$. That is, the contact portion 55 in the first planarization film 51 of the lower layer and the contact portion 56 in the second planarization film 52 of the upper layer are provided at different positions in plan view.

The above means that the contact portion 55 on the first planarization film 51 side can be arranged regardless of the position of the contact portion 56 on the second planarization film 52 side due to interposition of the metal wiring 53 between the contact portion 55 and the contact 56. Accordingly, degree of freedom in the layout of the circuit unit connected to the contact portion 55, specifically, the sub-pixel electrodes $46_A$ and $46_B$ in the drive circuit $47_A$ shown in FIG. 8 is increased. The same applies to the relation between the contact portion 59 and the contact portion 60 on the sub-pixel electrode 45 side.

In the pixel structure according to Example 1 having the above structure, the sub-pixel electrodes $46_A$ and $46_B$ are electrically connected to each other through the contact portions 56 and 57 by the metal wiring 53 as well as these sub-pixel electrodes $46_A$ and $46_B$ are electrically connected to the drive circuit $47_B$ through the contact portion 55.

The sub-pixel electrodes $46_A$ and $46_B$ have been explained as the above, and the sub-pixel electrode 45 will be explained as follows. That is, as shown in FIG. 9A, the sub-pixel electrode 45 is electrically connected to the drive circuit $47_A$ shown in FIG. 8 through the contact portions 59 and 60 formed in the first and second planarization films 51 and 52 by a metal wiring 58 formed between the planarization films 51 and 52 having the two-layer structure.

As described above, when applying the pixel structure according to Example 1, respective film thicknesses of the first and second planarization films 51 and 52 can be formed to be thinner than the film thickness of the planarization film of the one-layer structure by forming the planarization film to have the two-layer structure. Accordingly, the two sub-pixel electrodes $46_A$ and $46_B$ on the second planarization film 52 can be electrically connected by the metal wiring 53 between the planarization films 51 and 52.

Here, the contact portions 56 and 57 are arranged by being shifted from the contact hole 55 of the first planarization film 51, therefore, the film thicknesses of the contact portions can be thinner. Therefore, diameters of the contact holes $56_A$ and $57_A$ can be smaller at the time of forming the contact portions 56 and 57 in the second planarization film for electrical connection by the metal wiring 53. Accordingly, the contact pedestal of the contact portions 56 and 57 can be formed to be smaller, therefore, the pixel size is not increased.

In the pixel structure according to Example 1, the pixel electrode of one pixel 4 is divided into three sub-pixel electrodes 45, $46_A$, and $46_B$ having the same size, upper and lower two sub-pixel electrodes 46A and 46B make a pair and driven at the same time to assign weights of 2:1 in the pixel areas, thereby expressing four gradations by 2-bit. In the pixel structure of the three-divided pixels applying the area gradation method, positions of centroids of upper-order and lower-order respective bits, namely, the positions of the centroids of display in the sub-pixel electrodes 46A and 46B match (correspond to) with the position of the centroid of display in the sub-pixel electrode 45.

In the pixel structure applying the area gradation method as described above, good gradation display can be realized when the positions of centroids match in respective bits as compared with the case of the pixel structure in which the positions does not match. The pixel structure of three-divided pixels has been explained as an example as the above, however, the pixel structure is not limited to the structure of three-divided pixels. That is, better gradation display can be realized in pixel structures of four or more divided pixels as long as the positions of centroids match in respective bits.

Example 2

As described above, when taking the VA (vertical alignment) mode in area gradation, it is difficult to obtain good liquid crystal alignment because voltage to be applied to liquid crystal molecules varies according to the shape and the size of electrodes. The gradation design is also difficult as the area ratio of the sub-pixel electrodes (reflective electrodes) is not always the reflectance ratio. The pixel structure according to Example 2 has been made in view of the above points.

Figure 10A:
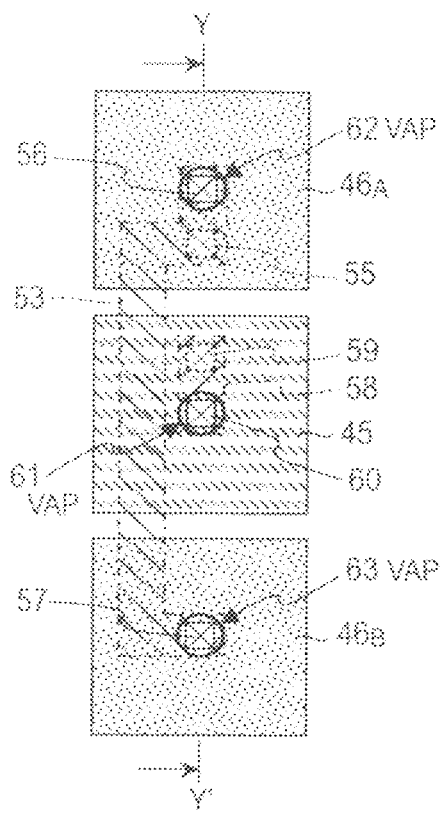
Figure 10B:
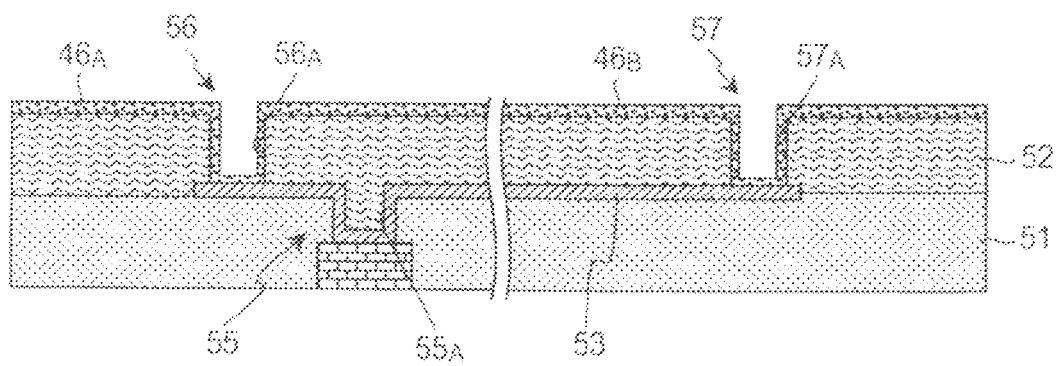

FIGS. 10A and 10B are explanatory views concerning a pixel structure of the three-divided pixels applying the area gradation method according to Example 2, in which the same signs are given to the portions equivalent to FIGS. 9A and 9B. In FIGS. 10A and 10B, FIG. 10A is a plan view showing three sub-pixel electrodes and FIG. 10B is an arrow cross-sectional view taken along line Y-Y' of FIG. 10A.

In the pixel structure according to Example 2, the configuration of electrically connecting two sub-pixel electrodes 46A and 46B is basically the same as the pixel structure according to Example 1. That is, the pixel structure according Example 2 has a structure in which the planarization film has the two-layer structure, the metal wiring 53 is formed between the first and second planarization films 51 and 52 having the two-layer structure, and the two sub-pixel electrodes $46_A$ and $46_B$ on the second planarization film 52 are electrically connected by the metal wiring 53.

The pixel structure according to Example 2 further includes alignment agents 61, 62 and 63 for controlling vertical alignment. The alignment agents 61, 62 and 63 belong to a kind of alignment control units called VAP (Vertical Alignment Protrusion), having a function of prescribing a direction to which liquid crystal molecules tilt when an electric field is added, that is, giving the trigger for liquid crystal molecules titling to a predetermined direction.

The alignment agents 61, 62 and 63, namely, the VAPs 61, 62 and 63 are provided at respective central parts of the central sub-pixel electrode 45 as well as two sub-pixel electrodes $46_A$, $46_B$. On the other hand, the second planarization film 52 includes the contact portion 60 at a portion corresponding to the central position of the central sub-pixel electrodes 45 as well as includes the contact portions 56 and 57 at portions corresponding to respective central positions of the two sub-pixel electrodes $46_A$, $46_B$.

That is, respective arrangement positions of the VAPs 61, 62 and 63 correspond to respective arrangement positions of the contact portions 60, 56 and 57. In other words, in the pixel structure according to Embodiment 2, the contact portions 60, 56 and 57 provided in the second planarization film 52 are used as (double as) the VAPs 61, 62 and 63.

As described above, the pixel structure according to Example 2 includes the VAPs 61, 62 and 63 in respective central parts of the central sub-pixel electrode 45 and the two sub-pixel electrodes $46_A$ and $46_B$ sandwiching the sub-pixel electrode 45 when applying the VA mode in the area gradation method. According to the structure, the following operations and effects can be obtained in addition to the operations and effects according to Example 1.

As respective electrode shapes of the three-divided sub-pixel electrodes 45, 46A and 46B are equal and electric-field distribution is uniform in respective sub-pixel electrodes 45, 46A and 46B, therefore, the trigger for liquid crystal molecules titling to a predetermined direction can be given due to the operation of the VAPs 61, 62 and 63 when an electric field is added. As a result, liquid crystal can be aligned in a good way. As the contact portions 60, 56 and 57 double as the VAPs 61, 62 and 63, it is not necessary to provide the VAPs 61, 62 and 63 separately.

However, the configuration of the VAPs 61, 62 and 63 is not limited to the configuration in which the contact portions 60, 56 and 57 double as the VAPs 61, 62 and 63, and other configurations, for example, a configuration in which holes are formed on the metal wirings 53, 58 and the holes are used as the VAPs 61, 62 and 63 can be applied. It is also conceivable that protrusions are provided to be used as the VAPs 61, 62 and 63. In any case, it is preferable that the VAPs 61, 62 and 63 are positioned at respective central parts of the three sub-pixel electrodes 45, $46_A$ and $46_B$.

The case in which the pixel structure according to the embodiment is applied to the liquid crystal display device having pixels including memories (MIP pixels) has been explained as the above, however, the structure is not limited to the above application example. That is, it does not matter whether the pixel has the MIP pixel structure or not. However, many circuit components such as transistors and contact portions exist in one pixel and circuit density is high in the case of the MIP pixel structure, therefore, there is little room in the layout area. From the viewpoint of realizing of the high definition device, the number of contacts and wirings does not increase in the pixel structure according to the embodiment, therefore, operations and effects can be sufficiently exerted by being applied to the display device having the MIP pixel structure.

Concerning the technical matter in which the planarization film is formed to be the two-layer structure, the metal wiring is formed between the two planarization films of the two-layer structure and two electrodes formed on the upper planarization film are electrically connected by the metal wiring, it does not matter whether the applicable liquid crystal display device applies the area gradation method or not. That is, the embodiment of the present disclosure can be applied to liquid crystal display devices in general applying the configuration of electrically connecting two electrodes arranged on the arranged on the planarization film.

[1-6. Specular Reflection]

In the reflective liquid crystal display device, preferably, the reflective liquid crystal display device using a front scattering film (light control film), specular reflection is ideal in the sub-pixel electrodes 45, 46$_A$, and 46$_B$ as the reflectors (reflective electrodes). However, in the common liquid crystal display device, the planarization film is formed on wiring formed as the drive circuit, namely, the projections and depressions of wiring in the TFT circuit unit 2, particularly the pixel array unit 21, and the reflective electrodes are formed on the film.

Therefore, the reflectance and contrast will be reduced due to scattering factors which are cited below.

Figure 11:
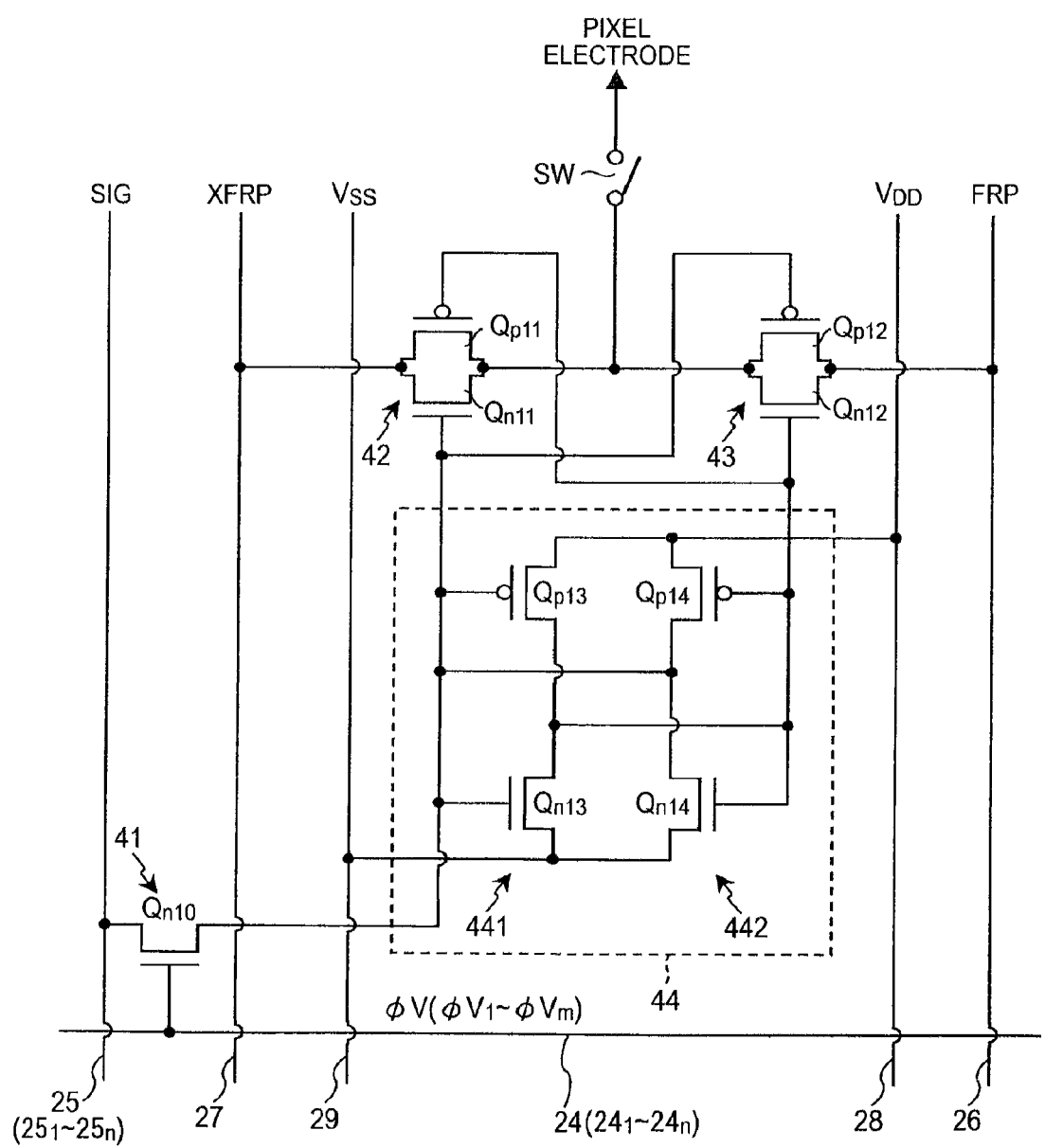
FIG. 11 is an explanatory diagram concerning a switching device selectively supplying power to the pixel electrode.

Residual surface roughness due to projections and depressions of wiring projections and depressions due to wring just below the reflective electrode Contact portions with respect to the pixel electrode and tapered regions around the portions In order to arrange the sub-pixels without limitation when applying the area gradation method, a switching device SW for selectively supplying power to the pixel electrode is necessary in all pixels as shown in FIG. 11. As the switching device SW, a transistor, for example, a thin-film transistor (TFT) can be used. As the switching device SW is added to each pixel 4, the circuit density in the pixel array unit 21 is increased accordingly.

[1-7. Structure of Pixel Array Substrate According to Embodiment]

In the present embodiment, a pixel array substrate (TFT array substrate) used when applying the area gradation method in the reflective liquid crystal display device will have the following structure.

First, the planarization film to be formed for planarizing the structure of the pixel array substrate on the substrate on which the circuit unit, namely, the TFT circuit unit 2 is formed has the two-layer structure in which the first and second planarization films (corresponding to the planarization films 51 and 52 of FIG. 9B) are sequentially stacked. Then, the relay wiring is formed between the first and second planarization films having the two-layer structure. The first contact portion formed in the first planarization film and connected to the TFT circuit unit 2 is electrically connected to the second contact portion formed in the second planarization film at the different position from the first contact portion in plan view.

The planarization films to be formed on the substrate have the two-layer structure in the above structure of the pixel array substrate, therefore, the surface roughness due to projections and depressions of wiring in the circuit can be planarized more reliably as compared with the case of the planarization film having the one-layer structure. Additionally, the relay wiring is interposed between the first contact portion and the second contact portion, therefore, the arrangement position of the second contact portion is not limited by the circuit pattern even when the circuit density of the TFT circuit unit 2 to which the first contact portion is connected is increased. In other words, the second contact portion to be formed on the second planarization film can be laid out freely.

As described above, the surface roughness due to projections and depressions of wiring in the circuit can be planarized more reliably and the second contact portion formed on the second planarization film can be laid out freely so as not to affect image quality, therefore, the reflective liquid crystal display device with high display quality can be provided. An example of the structure of the pixel array substrate according to the embodiment will be specifically explained with reference to the drawings.

(Substrate Structure)

Figure 12:
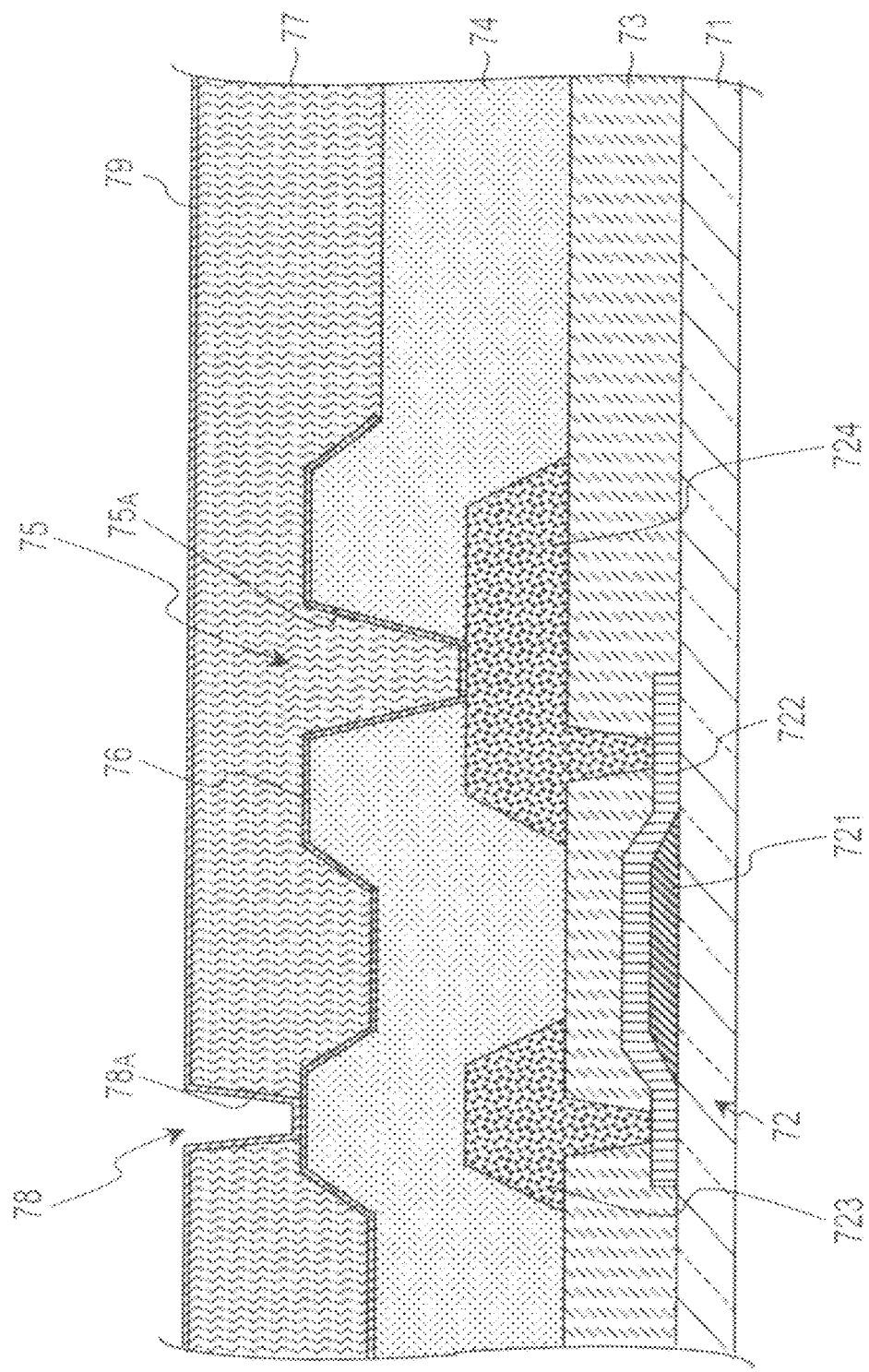
FIG. 12 is a cross-sectional view of a relevant part showing an example of a specific structure of the pixel array substrate according to the embodiment.

FIG. 12 is a cross-sectional view of a relevant part showing an example of a specific structure of the pixel array substrate according to the embodiment.

In FIG. 12, the circuit unit including a transistor 72 is formed on the surface of a transparent substrate (base material) 71. As the transparent substrate 71, for example, a glass substrate is used. As the transistor 72, for example, a TFT (thin-film transistor) is used. That is, the circuit unit including the transistor 72 correspond to the TFT circuit unit 2 shown in FIG. 1 and FIG. 2. Many pixel areas are provided in an array state on the transparent substrate 71, and the transistor 72 is formed so as to correspond to each pixel 4.

The transistor 72 illustrated here functions as a switching device controlling the power supply to the pixel electrode provided in each pixel 4. That is, the transistor 72 corresponds to the switching device SW of FIG. 11. The transistors included in the pixel circuit (drive circuit) having the memory function shown in FIG. 5 and so on are included in the TFT circuit unit 2 formed on the transparent substrate 71, though not shown in FIG. 12.

The transistor (TFT) 72 has a configuration in which a gate electrode 721 is formed on the transparent substrate 71 and a semiconductor layer 722 forming an active layer is formed thereon. In the semiconductor layer 722, a center portion is a channel region and both ends are source/drain regions. Source/drain electrodes 723 and 724 made of a conductive material such as Al (aluminum) or Ti (titanium) are electrically connected to the source/drain regions at both sides of the semiconductor layer 722 through an insulating film 73.

The transparent substrate 71 on which the TFT circuit unit 2 including the transistor 72 is formed has projections and depressions on the upper surface thereof due to existence of metal wiring including the source/drain electrodes 723 and 724. In order to planarize the projections and depressions, a first planarization film 74 is formed so as to cover the TFT circuit unit 2 including the transistor 72. The first planarization film 74 corresponds to the first planarization film 51 of FIG. 9B. A contact hole 75$_A$ is formed in the first planarization film 74.

On the first planarization film 74, a conductive thin film made of, for example, ITO, is deposited to be a desired circuit pattern by photolithography and the like, thereby forming a relay wiring 76. ITO making the relay wiring 76 is also deposited on an inner wall of the contact hole 75$_A$ formed in the first planarization film 74, thereby forming a first contact portion 75 which electrically connect the relay wiring 76 to the transistor 72.

On the first planarization film 74, a second planarization film 77 is formed so as to cover the relay wiring 76 as the circuit pattern. The second planarization film 77 corresponds to the second planarization film 52 of FIG. 9B. A contact hole 78A is formed in the second planarization film 77. The contact hole 78$_A$ is laid out at a different position from the contact hole 75$_A$ formed in the first planarization film 74 in plan view.

On the second planarization film 77, a conductive thin film having high reflectance such as Ag (silver) or Al (aluminum) is deposited to be a desired pixel electrode pattern by photolithography, thereby forming a pixel electrode 79 as a reflective electrode. The pixel electrode 79 correspond to the sub-pixel electrode 45, the sup-pixel electrodes 46$_A$ and 46$_B$ of FIGS. 9A and 9B.

Ag or the like making the pixel electrode 79 is also deposited on an inner wall of the contact hole 78$_A$ formed in the second planarization film 77, thereby forming a second contact portion 78 which electrically connects the relay wiring 76 to the pixel electrode 79. As the contact hole 78$_A$ is laid out at a different position from the contact hole 75$_A$ in plan view, the second contact portion 78 is naturally laid out at a different position from the first contact portion 75 in plan view.

Here, the second contact portion 78 formed in the second planarization film 77 affects image quality as the portion corresponds to a scattering reflection area, namely, an optically inactive area. Therefore, the size and the layout position of the second contact portion 78 will be important for realizing high display quality of the liquid crystal display device.

As described above, the structure of the pixel array substrate according to the embodiment is the two-layer structure in which the planarization films formed on the transparent substrate 71 are formed by sequentially stacking the first and second planarization films 74 and 77 for the purpose of planarizing the substrate surface. According to the two-layer structure, roughness of the circuit, namely, the surface roughness due to projections and depressions of wiring can be planarized more reliably as compared with the planarization film having the one-layer structure as well as steps of the relay wiring 76 can be also planarized by the second planarization film 7.

Here, to planarize the substrate surface more reliably means that the pixel electrode 79 having higher planarity can be formed as the reflective electrode. The pixel electrode 79 having higher planarity can be formed, therefore, the reflective liquid crystal display device with higher reflectance and contrast can be obtained as compared with the related-art structure using the one-layer structure planarization film.

Figure 13A:
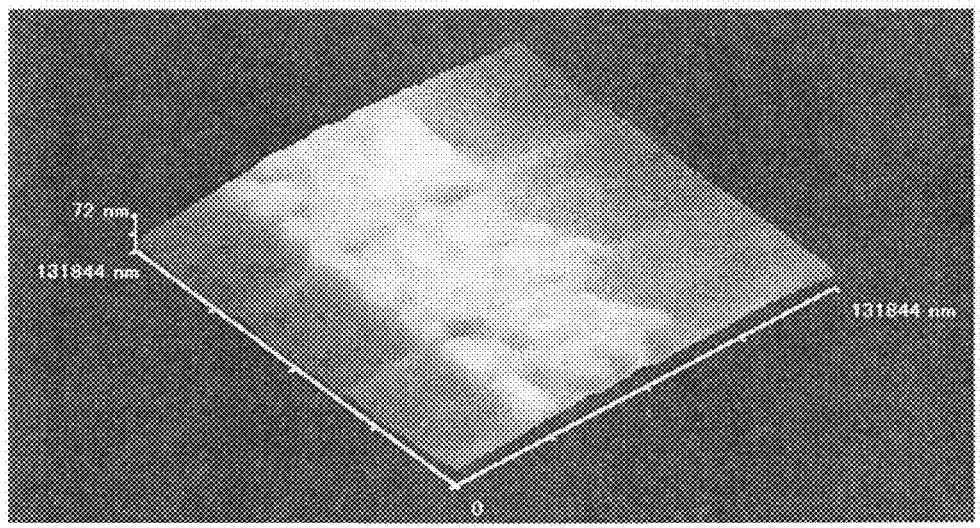
Figure 13B:
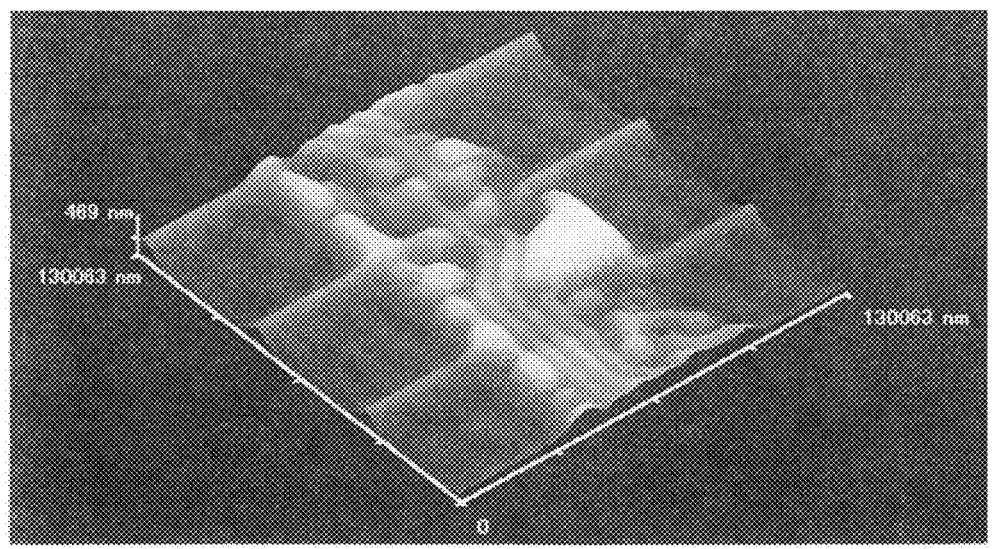

FIGS. 13A and 13B show roughness of the substrate surface obtained when the planarization film is formed and the pixel electrode is sequentially formed thereon in the TFT substrate having the pixel structure including memories, in which FIG. 13A shows the case of the planarization film having the two-layer structure and FIG. 13B shows the case of the one-layer structure as a comparative view. In this case, measured results obtained by measuring the surface roughness by an atomic force Microscope (AFM) are shown without forming the contact holes for comparing the planarizing effect.

In FIGS. 13A and 13B, Ra represents variations (planarity on the surface) and Rpv represents the maximum vertical difference (vertical difference between heaps and valleys). As shown in FIG. 13A, when the planarization film has the two-layer structure, the substrate surface is an approximately specular surface to the eyes. On the other hand, when the planarization film has the one-layer structure, there is surface roughness as shown in FIG. 13B.

Additionally, the first and second contact portions 75 and 78 are laid out at different positions and the both portions are connected by relay wiring 76, therefore, the TFT circuit unit 2 will not be a complicated structure even when the relay wring 76 is led due to the relation of layout positions of the contact portions 75 and 78. On the other hand, in the case of the related art structure with the one-layer planarization film, when the wiring under the planarization film is led due to the relation of layout positions of contact portions connected to the pixel electrode, the structure of the TFT circuit unit 2 will be complicated as the wiring is the wiring of the TFT circuit unit 2.

Furthermore, the first and second contact portions 75 and 78 are connected by the relay wiring 76, therefore, the layout position of the second contact portion 78 is not limited due to the circuit pattern even when the circuit density of the TFT circuit unit 2 is increased. In other words, the second contact portion 78 affecting the image quality which is formed in the second planarization film 77 can be laid out freely so that the effects on the image quality will be reduced. That is, the arrangement position of the second contact portion 78 can be arbitrarily set with respect to the arrangement position of the first contact portion 75.

Furthermore, the planarization film has the two-layer structure, respective film thicknesses of the first and second planarization films 74 and 77 can be formed to be thinner than the case of the one-layer structure planarization film. Therefore, the contact holes 75$_A$ and 78$_A$ formed in the first and second planarization films 74 and 77 can be formed so that diameters thereof are smaller. In particular, the diameter of the contact hole 78$_A$ to be formed in the second planarization film 77 can be smaller, therefore, the effects on the image quality can be suppressed to the minimum as well as one or more contact portions with the smaller size can be laid out freely in the second planarization film 77, combined with operations and effects by the relay wiring 76.

In the structure of the pixel array substrate according to the embodiment, the surface roughness due to projections and depressions of wiring in the circuit can be planarized more reliably as well as the second contact portion 78 formed in the second planarization film 77 can be formed with a smaller size and can be laid out freely so as not to affect the image quality. As a result, the reflective liquid crystal display device with high display quality can be provided by applying the structure of the pixel array substrate according to the embodiment.

(Manufacturing Method)

Subsequently, a manufacturing method of the structure of the pixel array substrate according to the embodiment will be explained with reference to a flowchart of FIG. 14.

First, the TFT substrate unit 2 including the transistor (TFT) 72 is formed on the transparent substrate (base material) 71 (Step S21). Next, a material for the first planarization film 74 is applied, exposed, developed and fired to thereby form the first planarization film 74 (Step S22).

FIG. 15A is a plan pattern view schematically showing a plan pattern of a pixel circuit in the state in which the first-layer planarization film (first planarization film) 74 is formed and FIG. 15B shows a cross-sectional structural view taken along line A-A' of the plan pattern view of FIG. 15A.

The plan pattern view of FIG. 15A is a pattern view corresponding to the circuit configuration using two pixel circuits (drive circuits) 47$_A$ and 47$_B$ including memories shown in FIG. 5 with respect to three sub-pixel electrodes (45, 46$_A$ and 46$_B$) as shown in FIG. 8. In relation to the circuit configuration of FIG. 5, the pixel 4 including the memory is configured by using transistors, specifically, TFTs as the switching devices 41 to 43 as well as the latch unit 44. In this case, the case where the switching devices 42 and 43 are configured by using a single conductive-type MOS transistor is shown as an example.

In the first-layer planarization film (first planarization film) 74, the contact portions are formed at portions corresponding to the output node N$_{out}$ of FIG. 5. The contact portions correspond to the contact portions 55 and 59 in FIGS. 9A and 9B. That is, as apparent from the plan pattern view of FIG. 15A, there are two contact portions (55 and 59) in the state in which the first-layer planarization film 74 is formed.

As a next process, the conductive thin film such as ITO is deposited on the first planarization film 74 (Step S23), then, the film is patterned to a desired circuit pattern by photolithography to thereby form the relay wiring 76 (Step S24). Next, a material for the second planarization film 77 is applied so as to cover the relay wiring 76 on the first planarization film 74 to thereby form the second planarization film 77 by exposing, developing and firing the material (Step S25).

Subsequently, the conductive thin film having high reflectance such as Ag or Al is deposited on the second planarization film 77 (Step S26), next, the film is patterned to a desired pixel electrode pattern by photolithography and so on to form the pixel electrode 79 as the reflective electrode (Step S27). According to the series of processing, the structure of the pixel array substrate according to the embodiment is formed. After that, the process proceeds to a cell process.

FIG. 16A is a plan pattern view for schematically showing a plan pattern of the pixel circuit in the state in which the pixel electrode 79 is formed, and FIG. 16B shows a cross-sectional structural view taken along line B-B' in the plan pattern view of FIG. 16A.

As apparent from FIG. 16A, there exists one contact portion in the central part of the pixel electrode 45 and there exists one contact portions each in central parts of the pixel electrodes 46$_A$ and 46$_B$, namely, the total three contact portions (60, 56 and 57) exist in the state in which the pixel electrode 79 is formed.

(Material of Planarization Films)

Next, materials for the first and second planarization films 74 (51) and 77 (52), particularly, materials for the planarization films 74 and 77 suitable for the two-layer structure will be explained.

In order to obtain high planarity in the one-layer structure planarization film, it is known that using materials with high melt flow rate is so effective. However, when using materials with high melt flow rate, the contact hole formed in the planarization film will be widened by the melt flow at the time of high-temperature firing. Then, the area formed when the contact hole is widened will be the scattering reflection area, namely, the optically inactive area. Here, the melt flow is one of measures indicating liquidity or workability of polymer in a solution state.

In response to the above, the first planarization film 74 is made of a material having a high melt flow rate as the first layer and the relay wiring 76 is formed on the planarization film 74, then, as the second layer, the second planarization film 77 is made of a material having a low melt flow rate inversely as the first layer. At this time, a glass transition point Tg of the second-layer planarization film 77 is higher than a firing temperature T in the firing process after the development of the second-layer planarization film 77.

In this case, materials in which the glass transition point Tg is higher than the firing temperature T (Tg>T) are defined as low melt flow materials and materials in which the glass transition point Tg is equal to or lower than the firing temperature T (Tg≤T) are defined as high melt flow materials. Here, the glass transition point Tg is a temperature at which thermodynamic differential amount changes from a crystal value to a liquid value rapidly in some degree when changing the temperature.

The melt flow rate matters in the process of Step S25 in the above manufacturing process (refer to FIG. 14), namely, in the process of applying, exposing, developing and firing the material of the second-layer planarization film 77. That is, as shown in FIGS. 17A to 17C, the second-layer planarization film 77 applied on the first-layer planarization film 75 is exposed and developed (FIG. 17A), after that, the firing is performed at the firing temperature T. A large difference is generated in the optically inactive area to be the scattering reflection area according to the melt flow rate of the material.

Specifically, when the material of the second-layer planarization film 77 is the material having the low melt flow rate, namely, the material in which the glass transition point Tg is higher than the firing temperature T (FIG. 17B), the widening of the contact hole (corresponding to the contact hole 78$_A$ of FIG. 12) formed in the planarization film 77 by the high-temperature firing can be suppressed. On the other hand, when the material of the second-layer planarization film 77 is the material having the high melt flow rate, namely, the material in which the glass transition point Tg is equal or lower than the firing temperature T (FIG. 17C), the contact hole will be widened by the melt flow at the high-temperature firing.

Figure 18B:
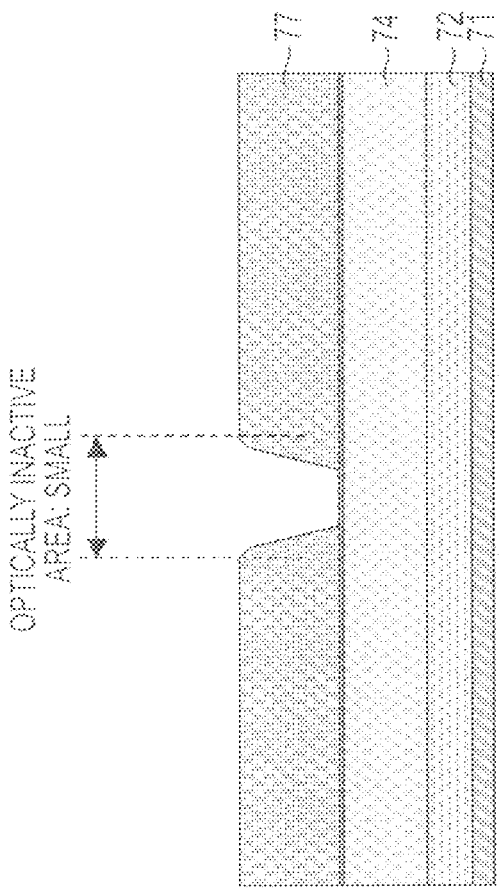
FIGS. 18A and 18B are explanatory views concerning a case where a material of the second-layer planarization film is a material having a low melt flow rate.
Figure 18A:
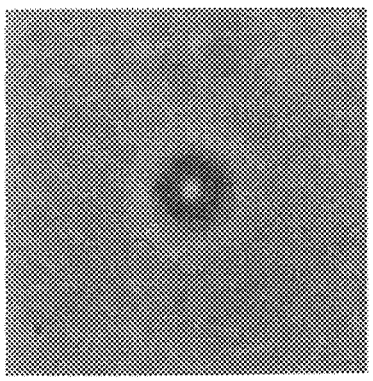

FIGS. 18A and 18B show a state of the contact hole obtained when the material of the second-layer planarization film 77 is the material having the low-melt flow rate. FIG. 18A shows a surface microscope image of the contact hole with incident-light illumination observed by reflecting light at a sample to be expanded, and FIG. 18B shows a cross section of the contact hole. The widening of the contact hole due to high-temperature firing can be suppressed by using the material having the low melt flow rate as the material for the second-layer planarization film 77, therefore, the optically inactive area to be the scattering reflection area will be small.

Figure 19B:
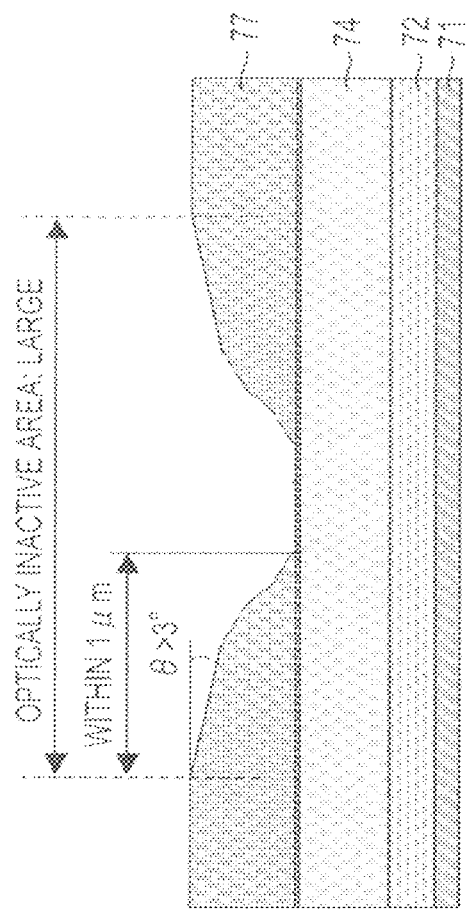
FIGS. 19A and 19B are explanatory views concerning a case where a material of the second-layer planarization film is a material having a high melt flow rate.
Figure 19A:
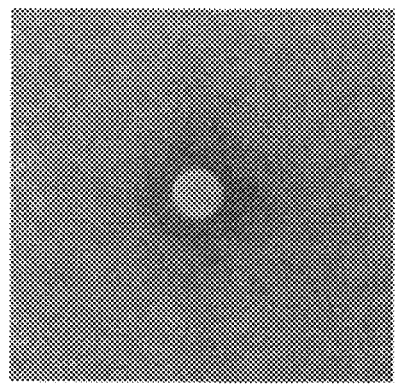

FIGS. 19A and 19B show a state of the contact hole obtained when the material of the second-layer planarization film 77 is the material having the high melt flow rate. FIG. 19A shows a surface microscope image of the contact hole with incident-light illumination and FIG. 19B shows a cross-section of the contact hole. The contact hole is widened due to the melt flow with high-temperature firing by using the material having the high melt flow rate as the material for the second-layer planarization film 77, therefore, the optically inactive area will be large as compared with the case of using the material with the low melt flow rate.

As described above, the widening of the contact hole formed in the planarization film 77 due to high-temperature firing can be suppressed by using the material having the low melt flow rate in which the glass transition point Tg is higher than the firing temperature T as the material for the second-layer planarization film 77, therefore, the widened area of the contact hole can be smaller. As a result, the optically inactive area to be the scattering reflection area which affects image quality can be made small, which contributes to improvement of display quality in the display device.

The case in which the structure of the pixel array substrate according to the embodiment is applied to the liquid crystal display device having pixels of MIP pixel structure has been explained as the above, however, the structure is not limited to the above application example. That is, it does not matter whether the pixel has the MIP pixel structure or not. However, when the structure of the pixel array substrate according to the embodiment is applied to the liquid crystal display having the MIP pixel structure, the following specific operations and effects can be obtained.

In the MIP pixel structure, many circuit components such as transistors and contact portions exist in one pixel, therefore, the circuit density is high and the layout structure on the TFT array substrate is complicated. The structure of the pixel array substrate according to the embodiment is applied when forming the pixel electrode on the TFT array substrate as the reflective electrode, thereby determining the layout of the contact portions having effects on the image quality freely in design of the relay wiring 76 formed on the first-layer planarization film 74. As a result, the circuit density can be reduced as well as the design specialized to the side of the pixel memory and the pixel switch (corresponding to the switching device SW of FIG. 11) can be realized.

2. Modification Example

The case where the present disclosure is applied to the liquid crystal display device has been explained as an example in the above embodiment, however, application of technical matters other than the technical matter in which the VAPs (alignment agents) are provided at respective central parts of the sub-pixel electrodes in the embodiment of the present disclosure are not limited to the VA system liquid crystal display device as well as common liquid crystal display devices. That is, the present disclosure can be applied to not only liquid crystal display devices in general but also display devices in general using an organic EL (electro luminescence) device, an inorganic EL device, a LED device, a semiconductor laser device and so on as an electro-optic device (light emitting device) of the pixel.

In the above application, it does not matter whether pixels includes memories (MIP pixels) or not. However, in the case of the MIP pixel structure, many circuit components such as transistors and contact portions exist in one pixel 4, therefore, there is little room in the layout area. From the viewpoint of realizing of the high definition device, the number of contacts and wirings does not increase in the embodiment of the present disclosure, therefore, operations and effects can be sufficiently exerted by being applied to the display device having the MIP pixel structure. In that case, the embodiment can be naturally applied to display devices in which the MIP is combined with the organic EL device, the inorganic EL device, the LED device, the semiconductor layer device and so on.

Concerning the technical matter in which the planarization film is formed to be the two-layer structure, the metal wiring is formed between the two planarization films of the two-layer structure and two electrodes formed on the upper planarization film are electrically connected by the metal wiring, it does not matter whether the applicable liquid crystal display device applies the area gradation method or not. That is, the embodiment of the present disclosure can be applied to liquid crystal display devices in general applying the configuration of electrically connecting two electrodes arranged on the planarization film to each other.

Furthermore, the case where the present disclosure is applied to the reflective liquid crystal display device has been explained as an example, however, application of the present disclosure is not limited to the reflective liquid crystal display device. That is, the present disclosure can be also applied to a transmissive liquid crystal display device and a semi-transmissive liquid crystal display device in the same manner as the reflective liquid crystal display device concerning respective technical matters of rewriting of pixel data, the pixel structure and the structure of the pixel array substrate. However, operations and effects can be exerted more sufficiently when applied to the reflective liquid crystal display device concerning the technical matter of the structure of the pixel array structure because the sub-pixel electrodes as the reflective electrodes can relatively realize specular reflection.

3. Electronic Apparatus

The display device according to the embodiment of the present disclosure which has been explained above can be used as display devices for electronic apparatuses in various fields displaying video signals inputted to the electronic apparatus or video signals generated in the electronic apparatus as images or video. As examples, the present disclosure can be applied to display devices for various electronic apparatuses, for example, display devices for a digital camera and a video camera, as well as display devices for portable terminal devices such as a cellular phone device, a PDA (Personal Digital Assistant) and an electronic book as shown in FIGS. 20A to 22G.

The display device according to the embodiment of the present disclosure includes module type devices having a sealed structure. For example, a display module formed by adhering an opposite portion made of a transparent glass or the like to the pixel array unit can be cited. It is also preferable that color filters, a protection film and so on are formed on the transparent opposite portion. The display module can be provided with a circuit unit or a FPC (flexible printed circuit) for inputting/outputting signals and so on to the pixel array unit from the outside.

Specific examples of electronic apparatuses to which the present disclosure is applied will be explained below.

Figure 20A:
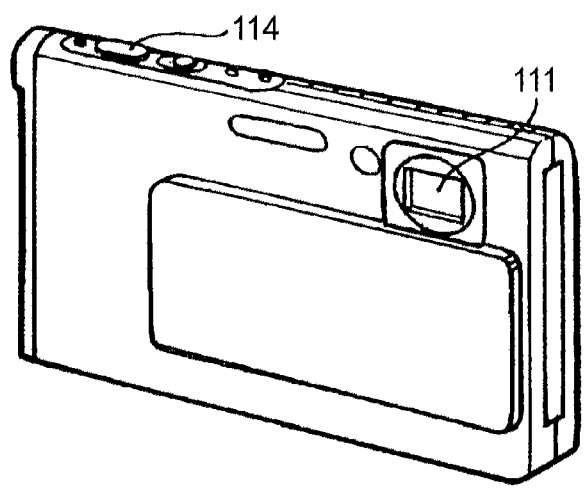
Figure 20B:
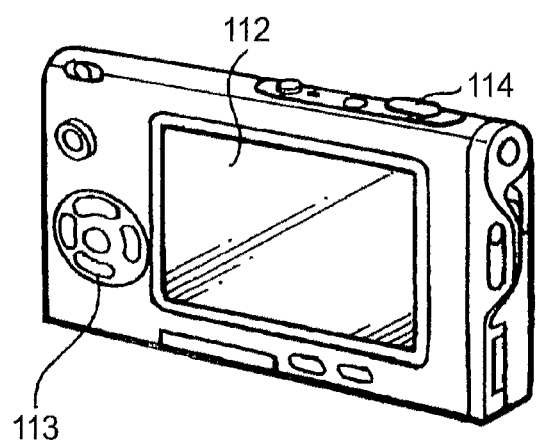

FIGS. 20A and 20B are perspective views showing external appearance of a digital camera to which the present disclosure is applied, in which FIG. 20A is a perspective view seen from the obverse side and FIG. 20B is a perspective view seen from the reverse side. The digital camera according to the application example includes a light emitting portion 111 for flash, a display portion 112, a menu switch 113, a shutter button 114 and so on, which is fabricated by using the display device according to the embodiment of the present disclosure as the display portion 112.

Figure 21:
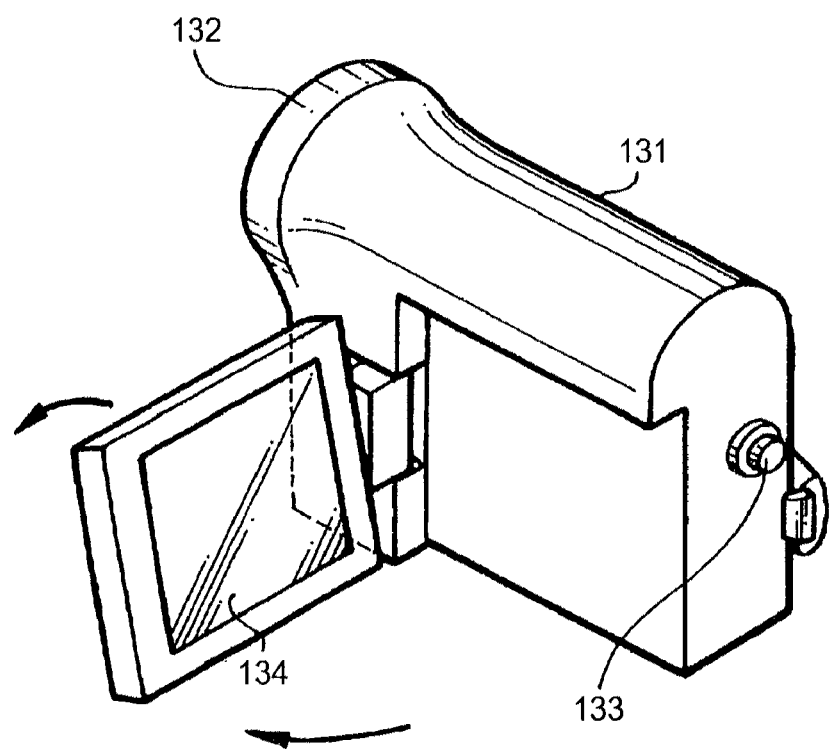
FIG. 21 is a perspective view showing an external appearance of a video camera to which the present disclosure is applied.

FIG. 21 is a perspective view showing external appearance of a video camera to which the present disclosure is applied. The video camera according to the present application example includes a body portion 131, a lens 132 for imaging a subject at a side surface facing the front, a start/stop switch 133 used at the time of imaging, a display portion 134 and so on, which is fabricated by using the display device according to the embodiment of the present disclosure as the display portion 134.

FIGS. 22A to 22G are external appearance views of a portable terminal device to which the present disclosure is applied, for example, a cellular phone device, in which FIG. 22A is a front view in an opened state, FIG. 22B is a side view thereof, FIG. 22C is a front view in a closed state, FIG. 22D is a left-side view, FIG. 22E is a right-side view, FIG. 22F is an upper surface view and FIG. 22G is a bottom view. The cellular phone device according to the application example includes an upper casing 141, a lower casing 142, a connecting portion (hinge portion in this case) 143, a display 144, a sub-display 145, a picture light 146, a camera 147 and so on. The cellular phone device according to the application example is fabricated by using the display device according to the embodiment of the present disclosure as the display 144 or the sub-display 145.

In this case, the cellular phone device is cited as the portable terminal device, however, the present disclosure can be applied to display devices of various portable terminal devices such as the PDA and the electronic book. Particularly, in the case where the display device according to the embodiment of the present disclosure is the reflective liquid crystal display device, power for emitting light inside is not necessary, therefore, there is an advantage that power consumption of the portable terminal device can be drastically reduced when applied to the display device of the portable terminal device which is frequently used at the outdoors. Concerning this point, the same applied to the digital camera and the video camera which are also frequently used at the outdoors.

The present disclosure contains subject matter related to that disclosed in Japanese Priority Patent Application JP 2010-283486 filed in the Japan Patent Office on Dec. 20, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
a display unit in which pixels including memories are arranged;
a memory unit holding data;
a control unit rewriting the contents held by memories concerning pixels belonging to a partial area of the display unit based on data held by the memory unit in accordance with instructions given from the outside,
wherein the data and the instructions are given in time series in the order of data and the instructions,
the instructions include area information concerning the partial area, and
the instructions include rewrite instruction information indicating rewriting in the partial area; and
a discrimination circuit discriminating the instructions,
wherein the discrimination circuit holds the area information included in the instructions in an area memory and holds the rewrite instruction information included in the instructions in a register.

2. The display device according to claim 1,
wherein the control unit performs rewriting control of the partial area based on the area information held by the area memory.

3. The display device according to claim 1,
wherein the control unit starts rewriting control of the partial area when receiving the rewrite instruction information held by the register.

4. The display device according to claim 1, further comprising:
a vertical driver capable of arbitrary selecting respective pixels in the display unit on a pixel row basis.

5. The display device according to claim 4,
wherein the vertical driver is configured by a decoder selecting pixel rows belonging to the partial area based on the area information held in the area memory.

6. A control method of a display device including a display unit in which pixels including memories are arranged, and a memory unit holding data, the method comprising:
rewriting the contents held by memories concerning pixels belonging to a partial area of the display unit based on data held by the memory unit in accordance with instructions given from the outside,
wherein the data and the instructions are given in time series in the order of data and the instructions,
the instructions include area information concerning the partial area, and
the instructions include rewrite instruction information indicating rewriting in the partial area; and
discriminating the instructions, wherein the discriminating includes holding the area information included in the instructions in an area memory and holding the rewrite instruction information included in the instructions in a register.

7. An electronic apparatus comprising:
a display device including
a display unit in which pixels including memories are arranged,
a memory unit holding data, and
a control unit rewriting the contents held by memories concerning pixels belonging to a partial area of the display unit based on data held by the memory unit in accordance with instructions given from the outside,
wherein the data and the instructions are given in time series in the order of data and the instructions,
the instructions include area information concerning the partial area, and
the instructions include rewrite instruction information indicating rewriting in the partial area; and
a discrimination circuit discriminating the instructions,
wherein the discrimination circuit holds the area information included in the instructions in an area memory and holds the rewrite instruction information included in the instructions in a register.

8. The display device according to claim 1, wherein the data is inputted from the outside in an asynchronous state with respect to a vertical synchronization signal.

9. The display device according to claim 1, wherein the data is to be rewritten concerning pixels belonging to the partial area.

10. The electronic apparatus according to claim 7, wherein the data is inputted from the outside in an asynchronous state with respect to a vertical synchronization signal.

11. The electronic apparatus according to claim 7, wherein the data is to be rewritten concerning pixels belonging to the partial area.

12. The electronic apparatus according to claim 7, wherein the control unit performs rewriting control of the partial area based on the area information held by the area memory.

13. The electronic apparatus according to claim 7, wherein the control unit starts rewriting control of the partial area when receiving the rewrite instruction information held by the register.

14. The electronic apparatus according to claim 7, further comprising:
a vertical driver capable of arbitrary selecting respective pixels in the display unit on a pixel row basis.

15. The electronic apparatus according to claim 14, wherein the vertical driver is configured by a decoder selecting pixel rows belonging to the partial area based on the area information held in the area memory.

16. The method according to claim 6, wherein the data is inputted from the outside in an asynchronous state with respect to a vertical synchronization signal.

17. The method according to claim 6, wherein the data is to be rewritten concerning pixels belonging to the partial area.

18. The method according to claim 6, wherein the rewriting of the contents comprises a rewriting control of the partial area based on the area information held by the area memory.

19. The method according to claim 6, wherein the rewriting of the contents comprises a rewriting control of the partial area when receiving the rewrite instruction information held by the register.

20. The method according to claim 6, further comprising:
arbitrarily selecting, by a vertical driver, respective pixels in the display unit on a pixel row basis, wherein the vertical driver is configured by a decoder selecting pixel rows belonging to the partial area based on the area information held in the area memory.

* * * * *